(12) United States Patent
Futahashi et al.

(10) Patent No.: US 8,573,339 B2
(45) Date of Patent: Nov. 5, 2013

(54) HYBRID INDUSTRIAL VEHICLE

(75) Inventors: Kensuke Futahashi, Takasago (JP);
Masataka Kawaguchi, Takasago (JP);
Kiyomitsu Ogawa, Sagamihara (JP)

(73) Assignee: Mitsubishi Nichiyu Forklift Co., Ltd., Nagaokakyo-shi (JP)

( * ) Notice: Subject to any disclaimer, the term of this patent is extended or adjusted under 35 U.S.C. 154(b) by 458 days.

(21) Appl. No.: 12/934,234

(22) PCT Filed: Aug. 5, 2008

(86) PCT No.: PCT/JP2008/064059
§ 371 (c)(1),
(2), (4) Date: Nov. 24, 2010

(87) PCT Pub. No.: WO2009/118924
PCT Pub. Date: Oct. 1, 2009

(65) Prior Publication Data
US 2011/0056755 A1 Mar. 10, 2011

(30) Foreign Application Priority Data
Mar. 27, 2008 (JP) .................. 2008-082373

(51) Int. Cl.
*B60K 6/20* (2007.10)

(52) U.S. Cl.
USPC .............. 180/65.21; 180/65.25; 180/65.26; 180/69.6

(58) Field of Classification Search
USPC ........... 180/54.1, 65.1, 65.21, 65.225, 65.26, 180/65.265, 65.27–65.31; 477/3, 5, 6, 72, 477/97; 903/906, 907, 911, 915
See application file for complete search history.

(56) References Cited

U.S. PATENT DOCUMENTS

| 6,589,130 B1 | 7/2003 | Baginski et al. |
| 7,464,778 B2 * | 12/2008 | Kato et al. ............... 180/65.245 |
| 2006/0243260 A1 | 11/2006 | Ichijo et al. |
| 2009/0025990 A1 | 1/2009 | Futahashi et al. |
| 2009/0174538 A1 | 7/2009 | Shibata et al. |

FOREIGN PATENT DOCUMENTS

| CN | 101121493 A | 2/2008 |
| JP | 61-21676 U | 2/1986 |
| JP | 64-29073 U | 2/1989 |
| JP | 7-315792 A | 12/1995 |

(Continued)

OTHER PUBLICATIONS

Chinese Office Action dated Jan. 6, 2013 for corresponding Chinese application No. 200880128165.X with English translation.

*Primary Examiner* — John Walters
*Assistant Examiner* — James Triggs
(74) *Attorney, Agent, or Firm* — Birch, Stewart, Kolasch & Birch, LLP

(57) ABSTRACT

A hybrid industrial vehicle performs steering operation and the like during idling stop, without using a complicated mechanism. The hybrid industrial vehicle configured to transmit power of a first electric motor (23) and power of an engine (21) to a drive wheel (34) through a first gear train (32) comprises: a second electric motor (24) actuated when supplied with electric power from a battery (22); a first hydraulic pump (26) supplying pressure oil to a cargo handling hydraulic system; a second gear train (28) interposed among the engine and the second electric motor and the first hydraulic pump and capable of mutual power transmission among the engine, the second electric motor and the first hydraulic pump; a second hydraulic pump (27) supplying pressure oil to a steering hydraulic system; and a third electric motor (25) actuated to drive the second hydraulic pump when supplied with electric power from the battery.

14 Claims, 15 Drawing Sheets

(56) References Cited

FOREIGN PATENT DOCUMENTS

| | | |
|---|---|---|
| JP | 2000-23310 A | 1/2000 |
| JP | 2002-225578 A | 8/2002 |
| JP | 2004-182128 A | 7/2004 |
| JP | 2006-273513 A | 10/2006 |
| JP | 2006-273514 A | 10/2006 |
| JP | 2006-273515 A | 10/2006 |
| JP | 2006-273516 A | 10/2006 |
| JP | 2006-273517 A | 10/2006 |
| JP | 2007-91054 A | 4/2007 |
| JP | 2007/138862 A1 | 12/2007 |
| JP | 2008-7089 A | 1/2008 |
| JP | 2008-56058 A | 3/2008 |
| JP | 2008-62822 A | 3/2008 |
| WO | WO 2008/026710 A1 | 6/2008 |

* cited by examiner

FIG. 9

VALVE OPERATION CONDITION TABLE

|  | WHILE ENGINE IS ACTUATED | | | | DURING IDLING STOP (WHILE ENGINE IS STOPPED) | | |
|---|---|---|---|---|---|---|---|
|  | CARGO-HANDLING/RUNNING | STEERING OPERATION | NOTHING PERFORMED (IDLING) | (DISCHARGE PRESSURE OF FIRST OIL PUMP) > (DISCHARGE PRESSURE OF SECOND OIL PUMP) | CARGO-HANDLING/RUNNING | STEERING OPERATION | (DISCHARGE PRESSURE OF FIRST OIL PUMP) > (DISCHARGE PRESSURE OF SECOND OIL PUMP) |
| EMBODIMENT 7 | a | a OR b | b | — | a | b | — |
| EMBODIMENT 8 | a | a OR b | b | c | a | b | c |
| EMBODIMENT 9 | a | a | b | — | a | a | — |
| EMBODIMENT 10 | a | a | b | c | a | a | c |

HYBRID INDUSTRIAL VEHICLE

BACKGROUND OF THE INVENTION

1. Field of the Invention

The present invention relates to a hybrid industrial vehicle including an engine and an electric motor as its drive source.

2. Description of the Related Art

Hybrid industrial vehicles each include an engine and an electric motor as its drive source, and are therefore capable of outputting a large amount of power while being excellent in energy efficiency. Hybrid forklifts have been known as an example of such hybrid industrial vehicles.

Since requiring large drive power for steering operation, many forklifts employ full hydraulic power steering in which the steering wheel and the road wheels are connected purely hydraulically, instead of a power steering as in the cases of passenger vehicles in which the steering wheel and the road wheels are connected by mechanical shafts and gears and steering is assisted by an actuator. Most of forklifts with the full hydraulic power steering are configured such that pressure oil for the drive for steering is supplied from a hydraulic pump which is also used to supply pressure oil for the drive for cargo handling.

Patent Document 1 listed below discloses a hybrid forklift having such configuration. The configuration of this hybrid forklift will be described based on FIG. 15. FIG. 15 is a configuration diagram of a drive system of the conventional hybrid forklift.

As shown in FIG. 15, the conventional hybrid forklift includes an engine 1, a battery 2, a first electric motor 3, a second electric motor 4, a first hydraulic pump 12, a second hydraulic pump 13, a first gear train 9, a second gear train 5, and so forth.

An output shaft 1a of the engine 1 is connected to the first gear train 9 through a one-way clutch 15 transmitting power only in a direction from the engine 1 side to the second gear train side, the second gear train 5, a torque converter 6, a transmission 7, and a forward-reverse clutch 8 provided to the transmission 7. Meanwhile, an output shaft 3a of the first electric motor 3 is connected directly to the first gear train 9. The first gear train 9 is connected to front wheels (drive wheels) 11 through a front axle 10 including a differential gear (not illustrated) and the like.

This hybrid forklift therefore runs when power of the first electric motor 3 and power of the engine 1 are transmitted to the front wheels 11 through the first gear train 9 to rotationally drive the front wheels 11. Note that the first electric motor 3 is actuated when supplied with electric power from the battery 2 through a first inverter 14.

Meanwhile, the second electric motor 4 has its output shaft 4a connected to the first hydraulic pump 12 through the second gear train 5. The second electric motor 4 is actuated when supplied with electric power from the battery 2 through a second inverter 17. The output shaft 1a of the engine 1 is also connected to the first hydraulic pump 12 through the second gear train 5. Thus, power of the engine 1 and power of the second electric motor 4 are transmitted to the first hydraulic pump 12 through the second gear train 5 to thereby rotationally drive the first hydraulic pump 12. As a result, pressure oil discharged from the first hydraulic pump 12 is supplied to a hydraulic cylinder in a cargo-handling hydraulic system and a hydraulic cylinder in a steering hydraulic system, which are not illustrated.

The input side of the second hydraulic pump 13 is connected to the hydraulic cylinder in the cargo-handling hydraulic system, whereas the output side thereof is connected to the second electric motor 4 through a one-way clutch 16 and the second gear train 5. Thus, while the lift is being lowered, the pressure oil discharged from the hydraulic cylinder in the cargo-handling hydraulic system rotationally drives the second hydraulic pump 13. By this second hydraulic pump 13, the second electric motor 4 is rotationally driven to function as a generator. The electric power generated by the second electric motor 4 functioning as a generator is charged into the battery 2 through the inverter 14 (i.e., cargo-handling regeneration is performed). Note that the engine 1 is started by an unillustrated starter motor dedicated to starting the engine.

Patent Document 1: Japanese Patent Application Publication No. 2008-7089

Patent Document 2: Japanese Patent Application Publication No. 2006-273514

SUMMARY OF THE INVENTION

Problems to be Solved by the Invention

Idling stop is one technique to improve the fuel consumption of the hybrid forklift. In the idling stop, the engine 1 is stopped while the vehicle is stopped or in an engine idle state where the forklift is not performing work. During idling stop, the engine 1 is stopped, but the forklift needs to be capable of performing steering operation even in such state.

In a case where the above conventional hybrid forklift performs idling stop, however, use of the second electric motor 4 alone is not enough to drive the first hydraulic pump 12 to such an extent as to supply sufficient pressure oil to the steering hydraulic system, because the configuration is such that the first hydraulic pump 12 alone supplies pressure oil to both the cargo-handling hydraulic system and the steering hydraulic system. For this reason, steering operation and engine start, for example, cannot be performed at the same time, and the steering operation has to be performed after the engine 1 is started.

Incidentally, Patent Document 2 listed above discloses a hybrid forklift having a configuration which allows steering operation and engine start at the same time by using planetary gears and a clutch. This hybrid forklift, however, requires electric motors large in capacity and size. Hence, the cost of the vehicle increases and also large spaces are needed to install such electric motors. Additionally, because the drive power for steering is obtained from a cargo-handling load portion, steering operation cannot be performed if the planetary gear portion to join and split the powers of the engine and the electric motors has trouble. In such situation, the running direction of the vehicle cannot be changed, making it impossible for the vehicle to run.

Thus, in view of the above circumstances, an object of the present invention is to provide a hybrid forklift which can perform steering operation and the like during idling stop (while its engine is stopped), without using complicated mechanisms such as a planetary gear and a clutch.

Means for Solving the Problems

A hybrid industrial vehicle of a first invention for solving the above problems is a hybrid industrial vehicle which includes an engine, a battery, a first electric motor actuated when supplied with electric power from the battery, and a first gear train, and which is configured to transmit power of the first electric motor and power of the engine to a drive wheel through the first gear train, the hybrid industrial vehicle comprising:

a second electric motor actuated when supplied with electric power from the battery;

a first hydraulic pump supplying pressure oil to a cargo-handling hydraulic system;

a second gear train interposed among the engine, the second electric motor and the first hydraulic pump and capable of mutual power transmission among the engine, the second electric motor and the first hydraulic pump;

a second hydraulic pump supplying pressure oil to a steering hydraulic system; and a third electric motor actuated to drive the second hydraulic pump when supplied with electric power from the battery.

A hybrid industrial vehicle of a second invention is the hybrid industrial vehicle of the first invention wherein the pressure oil discharged from the first hydraulic pump and the pressure oil discharged from the second hydraulic pump are merged on a hydraulic line shared by the first hydraulic pump and the second hydraulic pump, and then supplied to the cargo-handling hydraulic system and the steering hydraulic system.

A hybrid industrial vehicle of a third invention is the hybrid industrial vehicle of the second invention further comprising:

a hydraulic motor for cargo-handling regeneration actuated by pressure oil discharged from the cargo-handling hydraulic system; and power transmitting means transmitting power only in a direction from the hydraulic motor side to the second hydraulic pump side, the hybrid industrial vehicle characterized in that the hydraulic motor drives the third electric motor through the power transmitting means and the second hydraulic pump to thereby cause the third electric motor to function as a generator, and electric power generated by the third electric motor functioning as a generator is charged into the battery.

A hybrid industrial vehicle of a fourth invention is the hybrid industrial vehicle of the third invention wherein the power transmitting means is a one-way clutch transmitting power only in the direction from the hydraulic motor side to the second hydraulic pump side.

A hybrid industrial vehicle of a fifth invention is the hybrid industrial vehicle of the first invention wherein an accumulator is provided to a hydraulic line through which pressure oil is supplied from the second hydraulic pump to the steering hydraulic system.

A hybrid industrial vehicle of a sixth invention is the hybrid industrial vehicle of the second invention wherein an accumulator is provided to a hydraulic line through which pressure oil is supplied from the shared hydraulic line to the steering hydraulic system.

A hybrid industrial vehicle of a seventh invention is the hybrid industrial vehicle of the third invention wherein an accumulator is provided to a hydraulic line through which pressure oil from the shared hydraulic line is supplied to the steering hydraulic system.

A hybrid industrial vehicle of a eighth invention is the hybrid industrial vehicle of the first invention wherein a first hydraulic line through which pressure oil is supplied from the first hydraulic pump to the cargo-handling hydraulic system and a second hydraulic line through which pressure oil is supplied from the second hydraulic pump to the steering hydraulic system are connected to each other by a third hydraulic line, and the third hydraulic line is provided with a directional control valve switchable between a first state of allowing the first hydraulic line to communicate with the second hydraulic line, and a second state of allowing the first hydraulic line to communicate with a fourth hydraulic line communicating with an oil tank.

A hybrid industrial vehicle of a ninth invention is the hybrid industrial vehicle of the first invention wherein a first hydraulic line through which pressure oil is supplied from the first hydraulic pump to the cargo-handling hydraulic system and a second hydraulic line through which pressure oil is supplied from the second hydraulic pump to the steering hydraulic system are connected to each other by a third hydraulic line, and the third hydraulic line is provided with a directional control valve switchable among a first state of allowing the first hydraulic line to communicate with the second hydraulic line, a second state of allowing the first hydraulic line to communicate with a fourth hydraulic line communicating with an oil tank, and a third state of blocking flows among the first hydraulic line, the second hydraulic line and the fourth hydraulic line.

A hybrid industrial vehicle of a tenth invention is the hybrid industrial vehicle of the first invention wherein a first hydraulic line and a second hydraulic line are connected to each other through a directional control valve, so that pressure oil, which is discharged from the first hydraulic pump to the first hydraulic line, and pressure oil, which is discharged from the second hydraulic pump to the second hydraulic line, are merged and then supplied to the cargo-handling hydraulic system and the steering hydraulic system, and the directional control valve is switchable between a first state of allowing the first hydraulic line to communicate with the second hydraulic line and a second state of allowing the first hydraulic line to communicate with a third hydraulic line communicating with an oil tank.

A hybrid industrial vehicle of a eleventh invention is the hybrid industrial vehicle of the first invention wherein a first hydraulic line and a second hydraulic line are connected to each other through a directional control valve so that pressure oil, which is discharged from the first hydraulic pump to the first hydraulic line, and pressure oil, which is discharged from the second hydraulic pump to the second hydraulic line, are merged and then supplied to the cargo-handling hydraulic system and the steering hydraulic system, and the directional control valve is switchable among a first state of allowing the first hydraulic line to communicate with the second hydraulic line, a second state of allowing the first hydraulic line to communicate with a third hydraulic line communicating with an oil tank, and a third state of blocking flows among the first hydraulic line, the second hydraulic line and the third hydraulic line.

A hybrid industrial vehicle of a twelfth invention is the hybrid industrial vehicle of any one of the eighth to eleventh invention wherein an accumulator is provided to the second hydraulic line.

Effects of the Invention

The hybrid forklift of the first invention is a hybrid industrial vehicle which includes the engine, the battery, the first electric motor actuated when supplied with electric power from the battery, and the first gear train, and which is configured to transmit power of the first electric motor and power of the engine to the drive wheel through the first gear train. The hybrid forklift includes: the second electric motor actuated when supplied with electric power from the battery; the first hydraulic pump supplying pressure oil to the cargo-handling hydraulic system; the second gear train interposed among the engine, the second electric motor and the first hydraulic pump and capable of mutual power transmission among the engine, the second electric motor and the first hydraulic pump; the second hydraulic pump supplying pressure oil to the steering hydraulic system; and the third electric motor actuated to drive the second hydraulic pump when supplied with electric power from the battery. Accordingly, during idling stop (i.e., while the engine is stopped), pressure oil can be supplied to the steering hydraulic system to perform steering operation without having to use complicated mechanisms such as a planetary gear and a clutch, by driving the second hydraulic pump with the third electric motor. In addition, since power of the second electric motor can be transmitted to the engine through the second gear train, the second electric motor has a function of not only driving the first hydraulic pump through the second gear train but also of driving and starting the engine (i.e., no starter motor dedicated to starting the engine is required). Then, even in a situation, for example, where steering operation is being performed by actuating the third electric motor while the engine is stopped, the second electric motor can drive and start the engine. Thus, the engine can be quickly started without losing the feeling of the steering operation. Moreover, because steering operation can be performed by driving the second hydraulic pump with the third electric motor, the vehicle can run even when the second gear train has trouble.

The hybrid industrial vehicle of the second invention is the hybrid industrial vehicle of the first invention wherein: the pressure oil discharged from the first hydraulic pump and the pressure oil discharged from the second hydraulic pump are merged on the hydraulic line shared by the first hydraulic pump and the second hydraulic pump, and then supplied to the cargo-handling hydraulic system and the steering hydraulic system. Accordingly, an effect similar to that of the hybrid industrial vehicle of the first invention can be achieved. In addition, any of the engine, the second electric motor and the third electric motor can drive the cargo-handling hydraulic system and the steering hydraulic system. Thus, power from the third electric motor can be used for the drive for steering while the engine is stopped. Once started, the engine can secure the power for the drive for steering. The third electric motor therefore only needs to be able to secure an amount of pressure oil that is necessary for cargo handling and steering until the engine is started. This makes it possible to make the third electric motor smaller in capacity.

The hybrid industrial vehicle of the third invention is the hybrid industrial vehicle of the second invention further includes: the hydraulic motor for cargo-handling regeneration actuated by pressure oil discharged from the cargo-handling hydraulic system; and the power transmitting means transmitting power only in the direction from the hydraulic motor side to the second hydraulic pump side. The hybrid industrial vehicle is characterized in that: the hydraulic motor drives the third electric motor through the power transmitting means and the second hydraulic pump to thereby cause the third electric motor to function as a generator; and electric power generated by the third electric motor functioning as a generator is charged into the battery. Accordingly, an effect similar to that of the hybrid industrial vehicle of the second invention can be achieved. Moreover, since cargo-handling regeneration can be performed, it is possible to improve the energy efficiency to a further extent.

The hybrid industrial vehicle of the fourth invention is the hybrid industrial vehicle of the third invention wherein: the power transmitting means is the one-way clutch transmitting power only in the direction from the hydraulic motor side to the second hydraulic pump side. Accordingly, an effect similar to that of the hybrid industrial vehicle of the third invention can be achieved. Moreover, use of the one-way clutch makes it possible to carry out cargo-handling regeneration with a simple configuration.

The hybrid industrial vehicle of the fifth invention is the hybrid industrial vehicle of the first invention wherein: the accumulator is provided to the hydraulic line through which pressure oil is supplied from the second hydraulic pump to the steering hydraulic system and the like. Accordingly, by supplying the pressure oil stored in the accumulator to the steering hydraulic system, steering operation can be performed without having to actuate the second hydraulic pump (the third electric motor) for the steering operation. This makes it possible to reduce the frequency of actuation of the second hydraulic pump (the third electric motor) and improve the energy efficiency (fuel consumption) to a further extent.

The hybrid industrial vehicle of the sixth invention is the hybrid industrial vehicle of the second invention wherein: the accumulator is provided to the hydraulic line through which pressure oil is supplied from the shared hydraulic line to the steering hydraulic system. Accordingly, by supplying the pressure oil stored in the accumulator to the steering hydraulic system, steering operation can be performed without having to actuate the second hydraulic pump (the third electric motor) for the steering operation. This makes it possible to reduce the frequency of actuation of the second hydraulic pump (the third electric motor) and improve the energy efficiency (fuel consumption) to a further extent.

The hybrid industrial vehicle of the seventh invention is the hybrid industrial vehicle of the third invention wherein: the accumulator is provided to the hydraulic line through which pressure oil from the shared hydraulic line is supplied to the steering hydraulic system. Accordingly, by supplying the pressure oil stored in the accumulator to the steering hydraulic system, steering operation can be performed without having to actuate the second hydraulic pump (the third electric motor) for the steering operation. This makes it possible to reduce the frequency of actuation of the second hydraulic pump (the third electric motor) and improve the energy efficiency (fuel consumption) to a further extent.

The hybrid industrial vehicle of the eighth invention is the hybrid industrial vehicle of the first invention wherein: the first hydraulic line through which pressure oil is supplied from the first hydraulic pump to the cargo-handling hydraulic system and the second hydraulic line through which pressure oil is supplied from the second hydraulic pump to the steering hydraulic system are connected to each other by the third hydraulic line; and the third hydraulic line is provided with the directional control valve switchable between the first state of allowing the first hydraulic line to communicate with the second hydraulic line and the second state of allowing the first hydraulic line to communicate with a fourth hydraulic line communicating with the oil tank. Accordingly, by switching the directional control valve to the second state if the first hydraulic pump would otherwise be rotationally driven wastefully by the engine in an idle state or the like, pressure oil discharged from the first hydraulic pump is caused to flow into the oil tank so that the discharge pressure of the first hydraulic pump can hardly rise. This makes it possible to reduce wasteful power consumption and improve the fuel consumption to a further extent.

The hybrid industrial vehicle of the ninth invention is the hybrid industrial vehicle of the first invention wherein: the first hydraulic line through which pressure oil is supplied from the first hydraulic pump to the cargo-handling hydraulic system and the second hydraulic line through which pressure oil is supplied from the second hydraulic pump to the steering hydraulic system are connected to each other by the third hydraulic line; and the third hydraulic line is provided with the directional control valve switchable among the first state of allowing the first hydraulic line to communicate with the second hydraulic line, the second state of allowing the first hydraulic line to communicate with the fourth hydraulic line communicating with the oil tank, and the third state of blocking flows among the first hydraulic line, the second hydraulic line and the fourth hydraulic line. Accordingly, if the first hydraulic line requires a higher pressure than the second hydraulic line depending on the amount of cargo loaded, the third state of the directional control valve is selected to block certain oil flows so that the pressure oil may not flow wastefully from the first hydraulic line side to the second hydraulic line side. In this way, wasteful power consumption is reduced and the fuel consumption is improved. In addition, the third state of the directional control valve is selected to block certain oil flows when only the second hydraulic pump (i.e., the third electric motor) is actuated to supply pressure oil to the steering hydraulic system with the first hydraulic pump (i.e., the engine and the second electric motor) being not actuated. In this way, part of the pressure oil can be prevented from flowing wastefully from the second hydraulic line side to the first hydraulic line side through the directional control valve.

The hybrid industrial vehicle of the tenth invention is the hybrid industrial vehicle of the first invention wherein: the first hydraulic line and the second hydraulic line are connected to each other through the directional control valve so that pressure oil, which is discharged from the first hydraulic pump to the first hydraulic line, and pressure oil, which is discharged from the second hydraulic pump to the second hydraulic line, are merged and then supplied to the cargo-handling hydraulic system and the steering hydraulic system; and the directional control valve is switchable between the first state of allowing the first hydraulic line to communicate with the second hydraulic line, and the second state of allowing the first hydraulic line to communicate with the third hydraulic line communicating with the oil tank. Accordingly, by switching the directional control valve 72 to the second state b if the first hydraulic pump would otherwise be rotationally driven wastefully by the engine in an idle state or the like, pressure oil discharged from the first hydraulic pump is caused to flow into the oil tank so that the discharge pressure of the first hydraulic pump can hardly rise. This makes it possible to reduce wasteful power consumption and improve the fuel consumption to a further extent. In addition, when the directional control valve is switched to the first state, steering operation can be performed by using any of the first hydraulic pump (the engine and the second electric motor) and the second hydraulic pump (the third electric motor).

The hybrid industrial vehicle of the eleventh invention is the hybrid industrial vehicle of the first invention wherein: the first hydraulic line and the second hydraulic line are connected to each other through the directional control valve so that pressure oil, which is discharged from the first hydraulic pump to the first hydraulic line, and pressure oil, which is discharged from the second hydraulic pump to the second hydraulic line, are merged and then supplied to the cargo-handling hydraulic system and the steering hydraulic system; and the directional control valve is switchable among the first state of allowing the first hydraulic line to communicate with the second hydraulic line, the second state of allowing the first hydraulic line to communicate with a third hydraulic line communicating with an oil tank, and the third state of blocking flows among the first hydraulic line, the second hydraulic line and the third hydraulic line. Accordingly, if the first hydraulic line requires a higher pressure than the second hydraulic line depending on the amount of cargo loaded, the third state of the directional control valve is selected to block certain oil flows so that the pressure oil may not flow wastefully from the first hydraulic line side to the second hydraulic line side. In this way, wasteful power consumption is reduced and the fuel consumption is improved.

The hybrid industrial vehicle of the twelfth invention is the hybrid industrial vehicle of any one of the eighth to eleventh inventions wherein: the accumulator is provided to the second hydraulic line. Accordingly, by supplying the pressure oil stored in the accumulator to the steering hydraulic system, steering operation can be performed without having to actuate the second hydraulic pump (the third electric motor) for the steering operation. This makes it possible to reduce the frequency of actuation of the second hydraulic pump (the third electric motor) and improve the energy efficiency (fuel consumption) to a further extent.

BRIEF DESCRIPTION OF THE DRAWINGS

FIG. 9 is a diagram showing a table listing valve operation conditions.

EXPLANATION OF REFERENCE NUMERALS

21 engine, 22 battery, 23 first electric motor, 23*a* output shaft, 24 second electric motor, 24*a* output shaft, 25 third electric motor, 25*a* output shaft, 26 first hydraulic pump, 26*a* input shaft, 27 second hydraulic pump, 27*a* input shaft, 28 second gear train, 28*a* 28*b* gear, 28*c* 28*d* rotary shaft, 29 torque converter, 29*a* input shaft, 30 transmission, 30*a* output shaft, 31 forward-reverse clutch, 32 first gear train, 32*a* 32*b* gear, 32*c* 32*d* rotary shaft, 33 front axle, 33*a* input shaft, 34 front wheel (drive wheel), 35 first inverter, 36 second inverter, 37 hydraulic line, 38 control valve, 39 first hydraulic cylinder, 40 third inverter, 41 hydraulic line, 42 steering valve, 43 second hydraulic cylinder, 44 steering wheel, 45 braking hydraulic unit, 46 parking brake, 47 hand brake, 48 drum-type brake, 51 shared hydraulic line, 52 53, hydraulic line, 54 hydraulic valve, 55 hydraulic line, 61 hydraulic motor, 62 one-way clutch, 63 hydraulic line, 71 accumulator, 72 directional control valve, 73 third hydraulic line, 75 fourth hydraulic line (in Embodiments 7 and 8) or third hydraulic line (in Embodiments 9 and 10), 76 oil tank, 77 directional control valve, 81 accumulator pressure gauge, 82 controller, 91 engine actuated/stopped state detecting means, 92 cargo-handling/running state detecting means, 93 steering operation state detecting means, 94 idle state detecting means, 95 controller, 96 first-hydraulic-pump discharge pressure gauge, 97 second-hydraulic-pump discharge pressure gauge

DETAILED DESCRIPTION OF THE INVENTION

Hereinbelow, embodiments of the present invention will be described in detail based on the drawings.

Embodiment 1

Figure 1:
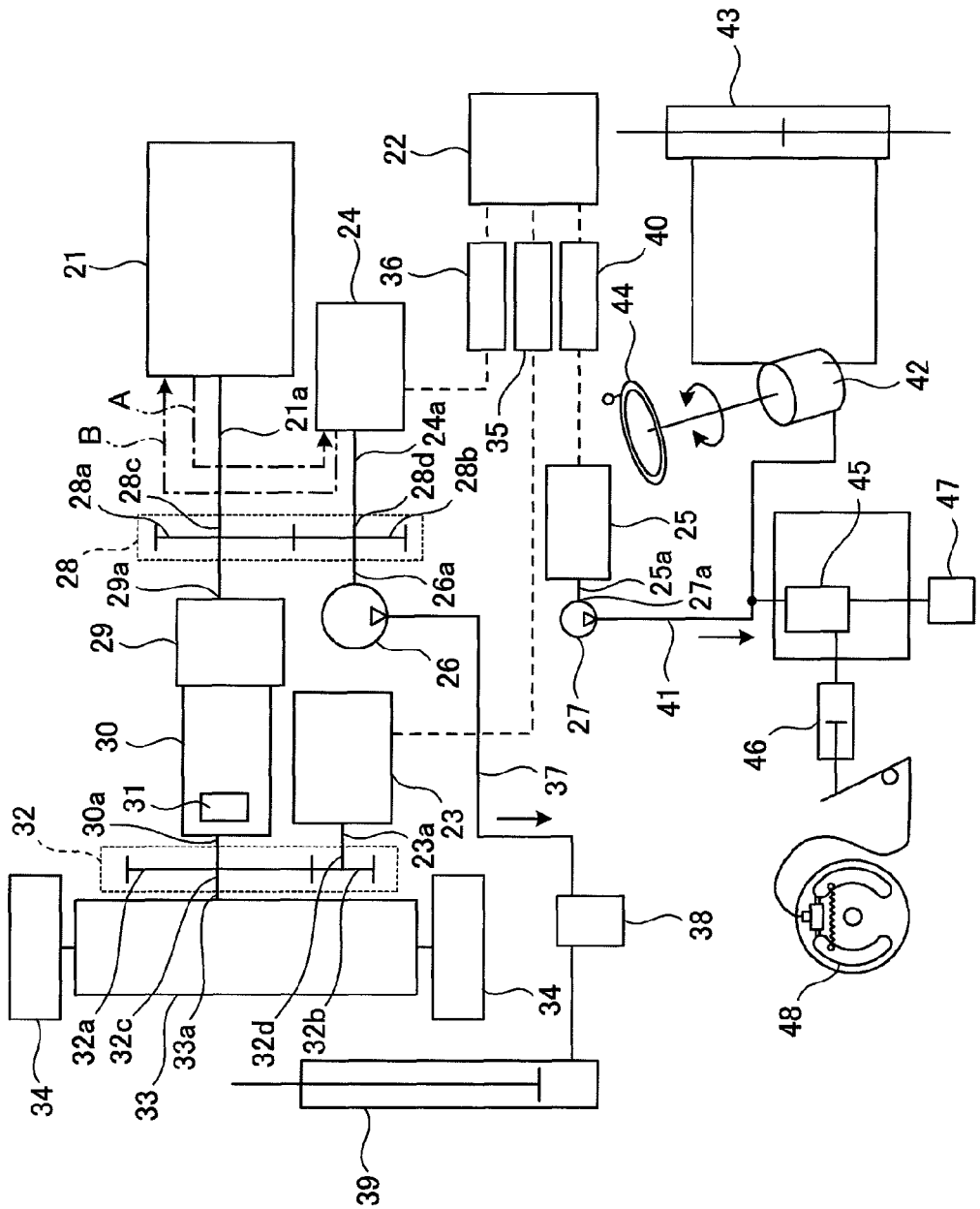
FIG. 1 is a configuration diagram of a drive system of a hybrid forklift according to Embodiment 1 of the present invention.

FIG. 1 is a configuration diagram of a drive system of a hybrid forklift according to Embodiment 1 of the present invention.

As shown in FIG. 1, the hybrid forklift of Embodiment 1 includes an engine 21, a battery 22, a first electric motor 23, a second electric motor 24, a third electric motor 25, a first hydraulic pump 26, a second hydraulic pump 27, a first gear train 32, a second gear train 28, and so forth.

An output shaft (rotary shaft) 21*a* of the engine 21 is connected to the first gear train 32 through the second gear train 28, a torque converter 29, a transmission 30, and a forward-reverse clutch 31 provided to the transmission 30. Meanwhile, an output shaft (rotary shaft) 23*a* of the first electric motor 23 is connected directly to the first gear train 32. The first gear train 32 is connected to front wheels (drive wheels) 34 through a front axle 33 including a differential gear (not illustrated) and the like.

The hybrid forklift therefore runs when power of the first electric motor 23 and power of the engine 21 are transmitted to the front wheels 34 through the first gear train 32 to thereby rotationally drive the front wheels 34.

To be specific, the second gear train 28 includes a gear 28*a* and a gear 28*b* which are either spur gears or helical gears meshing with each other. One end of a rotary shaft 28*c* of the gear 28*a* is coupled to the output shaft 21*a* of the engine 21, and the other end is coupled to an input shaft (rotary shaft) 29*a* of the torque converter 29. The first gear train 32 is a speed reducing mechanism including a large-diameter gear 32*a* and a small-diameter gear 32*b* which are either spur gears or helical gears meshing with each other. One end of a rotary shaft 32*c* of the gear 32*a* is coupled to an output shaft 30*a* of the transmission 30 (the clutch 31), and the other end is coupled to an input shaft 33*a* of the front axle 33. Meanwhile, a rotary shaft 32*d* of the gear 32*b* is coupled to the output shaft 23*a* of the first electric motor 23. Thus, the rotation of the first electric motor 23 is transmitted to the front axle 33 (the front wheels 34) after being reduced by the first gear train 32 (the gears 32*a* and 32*b*). Note that the first electric motor 23 is actuated when supplied with electric power from the battery 22 through a first inverter 35 (i.e., DC power is converted into AC power).

The hybrid forklift is capable of running by the first electric motor 23 alone, by the engine 21 alone, and also by the first electric motor 23 and the engine 21 together. For example, the hybrid forklift may use the first electric motor 23 while running at a low speed, such as when it is started. The hybrid forklift may use the engine 21 alone or the engine 21 and the first electric motor 23 together while running at a high speed. In addition, while the hybrid forklift is running by using the first electric motor 23, this first electric motor 23 also functions as a generator. The electric power generated by the first electric motor 23 can be charged into the battery 22 (i.e., braking energy is returned for regeneration) through the first inverter 35 (i.e., AC power is converted into DC power).

Meanwhile, the second electric motor 24 has its output shaft (rotary shaft) 24*a* connected to the first hydraulic pump 26 through the second gear train 28. The second electric motor 24 is actuated when supplied with electric power from the battery 22 through a second inverter 36 (i.e., DC power is converted into AC power). To be specific, one end of a rotary shaft 28*d* of the gear 28*b* is connected to the output shaft 24*a* of the second electric motor 24, and the other end is connected to an input shaft (rotary shaft) 26*a* of the first hydraulic pump 26.

The output shaft 21*a* of the engine 21 is also connected to the first hydraulic pump 26 through the second gear train 28 (the gears 28*a* and 28*b*). Thus, power of the engine 21 and power of the second electric motor 24 are transmitted to the first hydraulic pump 26 through the second gear train 28 to thereby rotationally drive the first hydraulic pump 26. As a result, pressure oil is discharged from the first hydraulic pump 26 and supplied to a first hydraulic cylinder 39 in a cargo-handling hydraulic system through a hydraulic line 37 and a control valve 38 provided to the hydraulic line 37. The first hydraulic cylinder 39 then lifts up and down a cargo loaded on an unillustrated fork, together with this fork.

In addition, since the engine 21 and the second electric motor 24 are connected to each other through the second gear train 28 (the gears 28*a* and 28*b*), the second electric motor 24 can be rotationally driven when power of the engine 21 is transmitted to the second electric motor 24 through the second gear train 28 as illustrated by an arrow A in FIG. 1. As a result, the second electric motor 24 functions as a generator. The electric power generated by this second electric motor 24 is charged into the battery 22 through the second inverter 36 (i.e., AC power is converted into DC power).

Moreover, since the engine 21 and the second electric motor 24 are connected to each other through the second gear train 28 (the gears 28*a* and 28*b*), power of the second electric motor 24 can be transmitted to the second electric motor 24 through the second gear train 28 as illustrated by an arrow B in FIG. 1. Accordingly, the engine 21 can be started by using the second electric motor 24 to drive the engine 21. That is, the second electric motor 24 also functions as a starter of the engine 21.

The hybrid forklift is of a fully hydraulic type in which a steering wheel 44 and unillustrated rear wheels (steered wheels) are connected purely hydraulically. The hybrid forklift is equipped with the third electric motor 25 and the second hydraulic pump 27 to drive a steering hydraulic system of such fully-hydraulic type (i.e., to supply pressure oil to the steering hydraulic system).

The third electric motor 25 has its output shaft (rotary shaft) 25a being coupled to an input shaft (rotary shaft) 27a of the second hydraulic pump 27. The third electric motor 25 is actuated when supplied with electric power from the battery 22 through a third inverter 40 (i.e., DC power is converted into AC power). As the second hydraulic pump 27 is rotationally driven by the third electric motor 25, pressure oil is discharged from the second hydraulic pump 27 and supplied to a second hydraulic cylinder 43 in the steering hydraulic system through a hydraulic line 41 and a steering valve 42.

The movement direction of the second hydraulic cylinder 43 is controlled by controlling the valve 42 (i.e., controlling the direction and volume of flow of the pressure oil) through the operation of the steering wheel 44. The unillustrated rear wheels (steered wheels) connected to the second hydraulic cylinder 43 are accordingly steered. Note that the pressure oil discharged from the second hydraulic pump 27 is also supplied to a parking brake 46 and a hand brake 47 through a braking hydraulic unit 45. Reference numeral 48 in FIG. 1 is a drum-type brake.

As described above, the hybrid forklift of Embodiment 1 is a hybrid forklift which includes the engine 21, the battery 22, the first electric motor 23 actuated when supplied with electric power from the battery 22, and the first gear train 32, and which is configured to transmit power of the first electric motor 23 and power of the engine 21 to the drive wheels 34 through the first gear train 32. The hybrid forklift includes: the second electric motor 24 actuated when supplied with electric power from the battery 22; the first hydraulic pump 26 supplying pressure oil to the cargo-handling hydraulic system; the second gear train 28 interposed among the engine 21, the second electric motor 24 and the first hydraulic pump 26 and, capable of mutual power transmission among the engine 21, the second electric motor 24 and the first hydraulic pump 26; the second hydraulic pump 27 supplying pressure oil to the steering hydraulic system; and the third electric motor 25 actuated to drive the second hydraulic pump 27 when supplied with electric power from the battery 22. Accordingly, during idling stop (i.e., while the engine is stopped), pressure oil can be supplied to the steering hydraulic system to perform steering operation without having to use complicated mechanisms such as a planetary gear and a clutch, by driving the second hydraulic pump 27 with the third electric motor 25.

In addition, since power of the second electric motor 24 can be transmitted to the engine 21 through the second gear train 28, the second electric motor 24 has a function of not only driving the first hydraulic pump 26 through the second gear train 28 but also of driving and starting the engine 21 (i.e., no starter motor dedicated to starting the engine is required). Then, even in a situation, for example, where steering operation is being performed by actuating the third electric motor 25 while the engine is stopped, the second electric motor 24 can drive and start the engine 21. Thus, the engine 21 can be quickly started without losing the feeling of the steering operation. Moreover, because steering operation can be performed by driving the second hydraulic pump 27 with the third electric motor 25, the vehicle can run even when the second gear train 28 has trouble.

Embodiment 2

Figure 2:
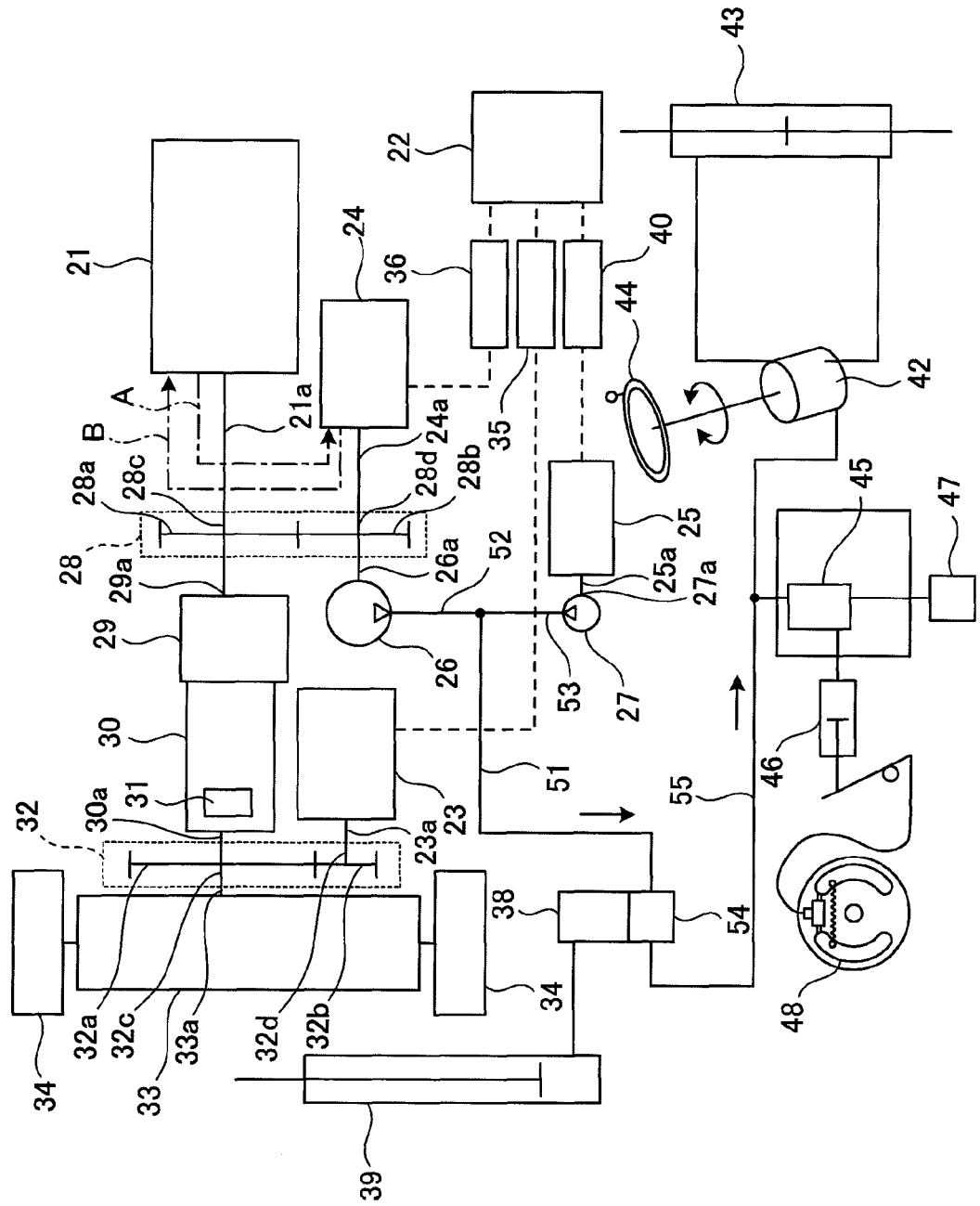
FIG. 2 is a configuration diagram of a drive system of a hybrid forklift according to Embodiment 2 of the present invention.

FIG. 2 is a configuration diagram of a drive system of a hybrid forklift according to Embodiment 2 of the present invention. Note that, in FIG. 2, the same components as those in Embodiment 1 (see FIG. 1) described above are denoted by the same reference numerals, and the duplicated description thereof will not be provided in detail.

As shown in FIG. 2, the hybrid forklift of Embodiment 2 is configured such that: the pressure oil discharged from the first hydraulic pump 26 driven by the engine 21 and the second electric motor 24 and the pressure oil discharged from the second hydraulic pump 27 driven by the third electric motor 25 are merged on a hydraulic line 51 shared by the first and second hydraulic pumps 26 and 27; and then supplied to the cargo-handling hydraulic system and the steering hydraulic system. In other words, any of the engine 21, the second electric motor 24 and the third electric motor 25 can drive the cargo-handling hydraulic system (the first hydraulic cylinder 39) and the steering hydraulic system (the second hydraulic cylinder 43).

To be specific, a hydraulic line 52 connected to the discharge side of the first hydraulic pump 26 and a hydraulic line 53 connected to the discharge side of the second hydraulic pump 27 are connected to the shared hydraulic line 51. A hydraulic valve 54 is provided to the hydraulic line 51. Thus, the pressure oil discharged to the hydraulic line 52 from the first hydraulic pump 26 driven by the engine 21 and the second electric motor 24 and the pressure oil discharged to the hydraulic line 53 from the second hydraulic pump 27 driven by the third electric motor 25 are merged on the hydraulic line 51, flow through the hydraulic line 51, and then flow in the hydraulic valve 54.

At the hydraulic valve 54, the pressure oil having flowed into the hydraulic valve 54 is split into hydraulic line 55 side pressure oil and control valve 38 side pressure oil. Then, the split pressure oil on the control valve 38 side is supplied to the first hydraulic cylinder 39 in the cargo-handling hydraulic system, whereas the split pressure oil on the hydraulic line 55 side is supplied to the second hydraulic cylinder 43 in the steering hydraulic system through the steering valve 42 and also to the parking brake 46 and the hand brake 47 through the braking hydraulic unit 45.

The other parts of the configuration are the same as those of Embodiment 1 described above.

As described above, the hybrid forklift of Embodiment 2 is a hybrid forklift similar to that of Embodiment 1 in which: the pressure oil discharged from the first hydraulic pump 26 and the pressure oil discharged from the second hydraulic pump 27 are merged on the hydraulic line 51 shared by the first hydraulic pump 26 and the second hydraulic pump 27, and then supplied to the cargo-handling hydraulic system and the steering hydraulic system. Accordingly, an effect similar to that of the hybrid forklift of Embodiment 1 described above can be achieved. In addition, any of the engine 21, the second electric motor 24 and the third electric motor 25 can drive the cargo-handling hydraulic system and the steering hydraulic system. Thus, power from the third electric motor 25 can be used for the drive for steering while the engine is stopped. Once started, the engine 21 can secure the power for the drive for steering. The third electric motor 25 therefore only needs to be able to secure an amount of pressure oil that is necessary for cargo handling and steering until the engine 21 is started. This makes it possible to make the third electric motor 25 smaller in capacity.

Embodiment 3

Figure 3:
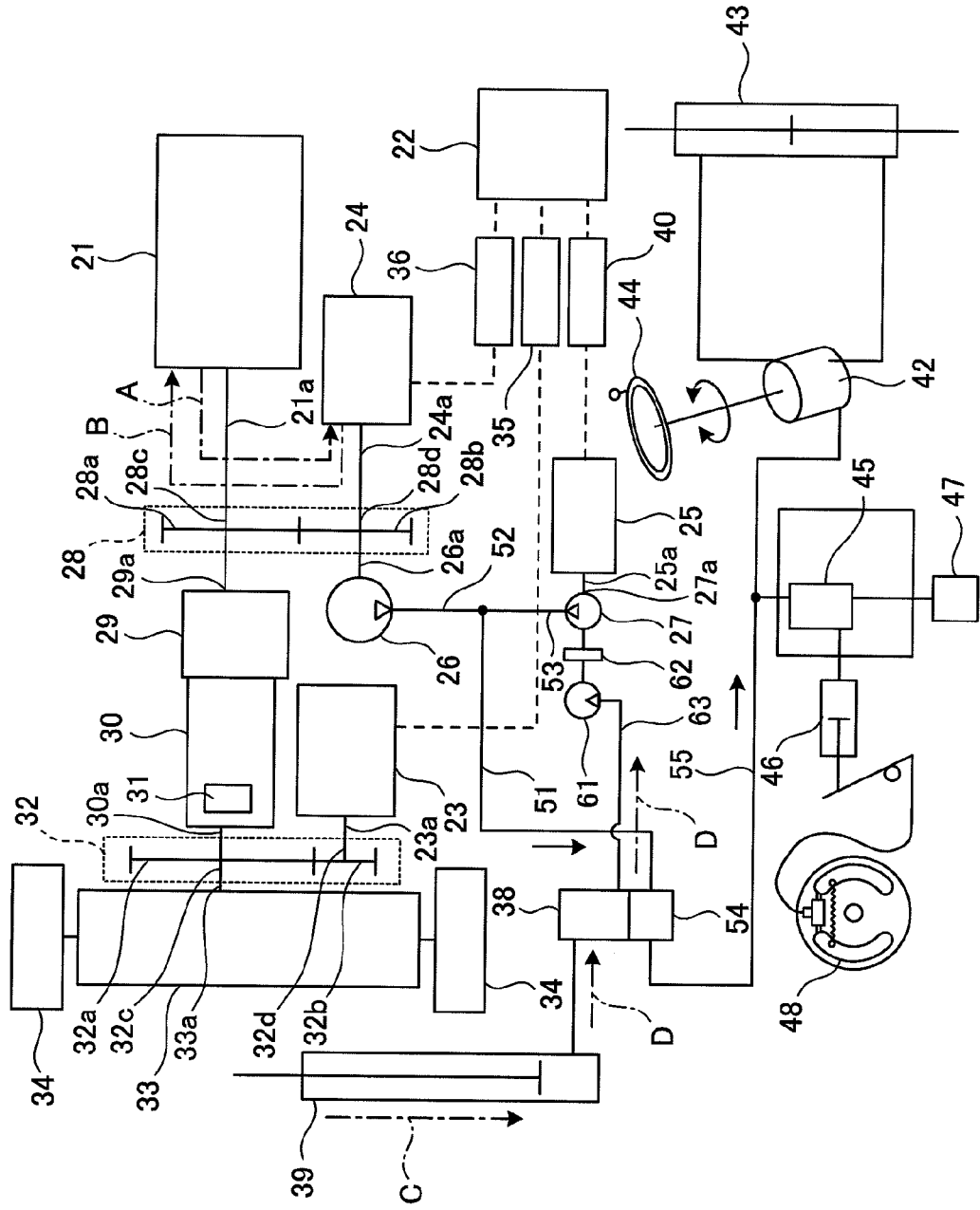
FIG. 3 is a configuration diagram of a drive system of a hybrid forklift according to Embodiment 3 of the present invention.

FIG. 3 is a configuration diagram of a drive system of a hybrid forklift according to Embodiment 3 of the present invention. Note that, in FIG. 3, the same components as those in Embodiment 2 described above (see FIG. 2) are denoted by the same reference numerals, and the duplicated description thereof will not be provided in detail.

As shown in FIG. 3, the hybrid forklift of Embodiment 3 has a configuration including: a hydraulic motor 61 for cargo-handling regeneration which is actuated by the pressure oil discharged from the cargo-handling hydraulic system; and a one-way clutch 62 as power transmitting means for transmitting power only in a direction from the hydraulic motor 61 side to the second hydraulic pump 27 side.

To be specific, the one-way clutch 61 is interposed between the hydraulic motor 61 and the second hydraulic pump 27. Moreover, the one-way clutch 62 transmits power only in the direction from the hydraulic motor 61 side to the second hydraulic pump 27 side, and does not transmits any power in a direction from the second hydraulic pump 27 side to the hydraulic motor 61 side. The input side of the hydraulic motor 61 is connected to the first hydraulic cylinder 39 in the cargo-handling hydraulic system through a hydraulic line 63 and the control valve 38.

In this way, when the lift is lowered as indicated by an arrow C in FIG. 3, the pressure oil discharged from the cargo-handling hydraulic system (the hydraulic cylinder 39) as indicated by an arrow D in FIG. 3 is supplied to the hydraulic motor 61 through the control valve 38 and the hydraulic line 63. As a result, the hydraulic motor 61 is rotationally driven by the pressure oil, and the power of the hydraulic motor 61 thus obtained is transmitted to the third electric motor 25 (the rotary shaft 25a) through the one-way clutch 62 and the second hydraulic pump 27 (the rotary shaft 27a). Accordingly, the third electric motor 25 is rotationally driven, functioning as a generator. The electric power generated by the third electric motor 25 functioning as a generator is charged into the battery 2 (i.e., cargo-handling regeneration is performed) through the inverter 14 (i.e., AC power is converted in DC power).

Note that the power transmitting means does not necessarily have to be a one-way clutch. A clutch capable of bi-directional power transmission may be used instead. In this case, fork fall detecting means may be used (e.g., to detect by detecting means such as a limit switch whether a lift up/down operation lever is moved to a lift-down side). Specifically, upon detection of falling movement of the fork, the clutch is put into a connected state so that power may be transmitted from the hydraulic motor 61 side to the second hydraulic pump 27 side through the clutch.

The other parts of the configuration are the same as those of Embodiment 2 described above.

As described above, the hybrid forklift of Embodiment 3 is a hybrid forklift similar to that of Embodiment 2 described above which includes: the hydraulic motor 61 for cargo-handling regeneration actuated by pressure oil discharged from the cargo-handling hydraulic system (the first hydraulic cylinder 39); and the one-way clutch 62 transmitting power only in the direction from the hydraulic motor 61 side to the second hydraulic pump 27 side. Further, in the hybrid forklift of Embodiment 3: the hydraulic motor 61 drives the third electric motor 25 through the one-way clutch 62 and the second hydraulic pump 27 to thereby cause the third electric motor 25 to function as a generator; and electric power generated by the third electric motor 25 functioning as a generator is charged into the battery 22. Accordingly, an effect similar to that of the hybrid forklift of Embodiment 2 described above can be achieved. Moreover, since cargo-handling regeneration can be performed, it is possible to improve the energy efficiency to a further extent.

Furthermore, use of the one-way clutch 62 makes it possible to carry out cargo-handling regeneration with a simple configuration.

Embodiment 4

Figure 4:
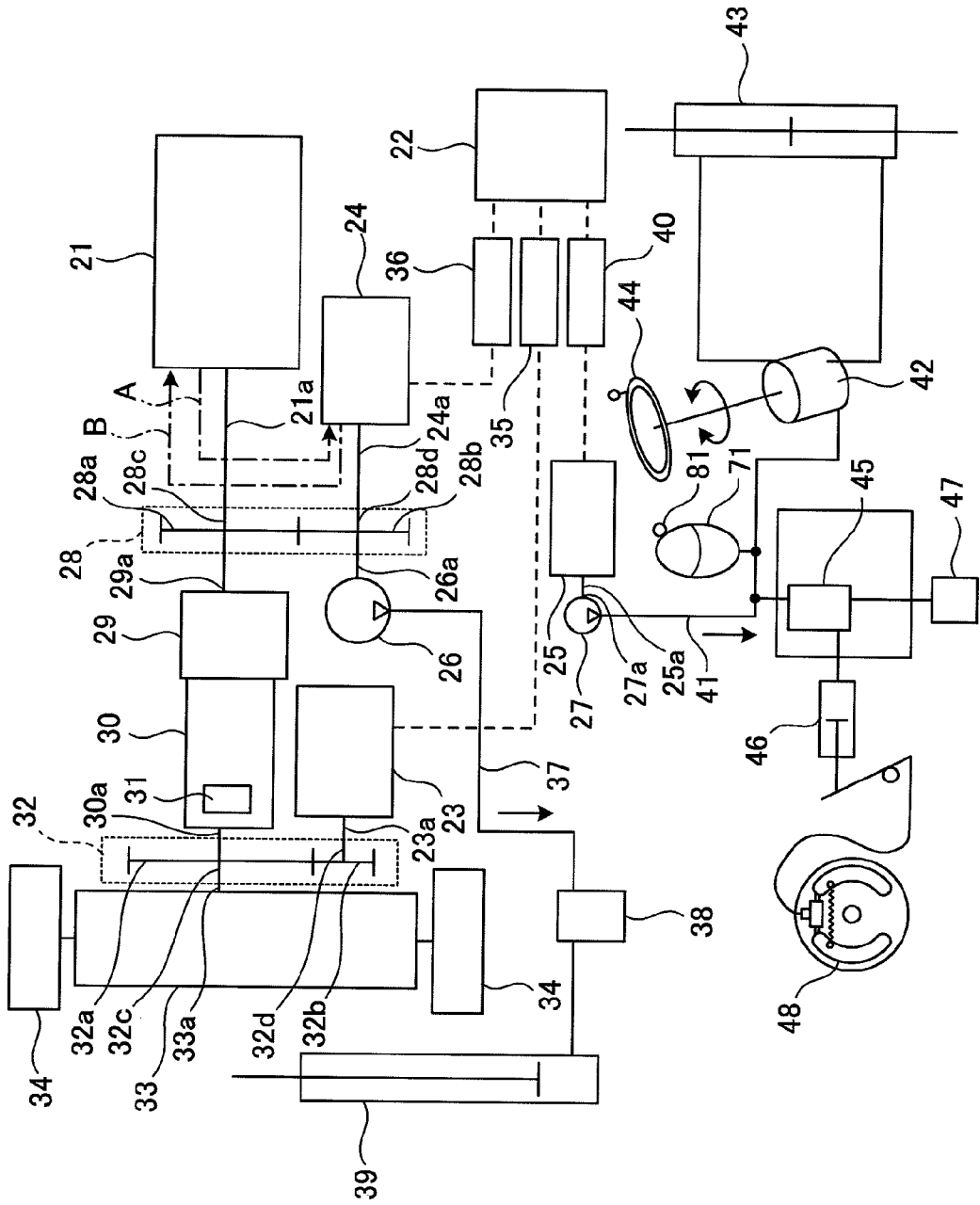
FIG. 4 is a configuration diagram of a drive system of a hybrid forklift according to Embodiment 4 of the present invention.

FIG. 4 is a configuration diagram of a drive system of a hybrid forklift according to Embodiment 4 of the present invention.

Figure 5:
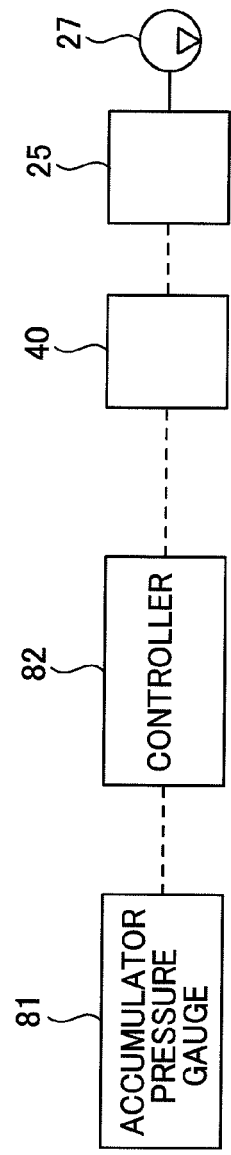
FIG. 5 is a control block diagram regarding an accumulator pressure (hydraulic pump control) of the hybrid forklift.

FIG. 5 is a control block diagram regarding an accumulator's pressure (hydraulic pump control) of the hybrid forklift. Note that, in FIG. 4, the same components as those in Embodiment 1 described above (see FIG. 1) are denoted by the same reference numerals, and the duplicated description thereof will not be provided in detail.

As shown in FIG. 4, the hybrid forklift of Embodiment 4 includes an accumulator 71 provided to the hydraulic line 41 through which pressure oil is supplied from the second hydraulic pump 27 to the steering hydraulic system (the steering valve 42 and the second hydraulic cylinder 43).

Thus, while pressure oil is being supplied to the steering hydraulic system from the second hydraulic pump 27 through the hydraulic line 41 by rotationally driving the second hydraulic pump 27 with the third electric motor 25, part of the pressure oil is stored (the hydraulic pressure is accumulated) in the accumulator 71. Therefore, even when the second hydraulic pump 27 (the third electric motor 25) is stopped, steering operation is possible since the pressure oil stored in the accumulator 71 can be supplied to the steering hydraulic system.

Moreover, the accumulator 71 is provided with an accumulator pressure gauge 81 to detect the pressure inside the accumulator 71 (accumulator pressure). As shown in FIG. 5, a controller 82 monitors the pressure in the accumulator 71 by receiving the pressure detection signals of the accumulator pressure gauge 81. Then, when the accumulator pressure detected by the accumulator pressure gauge 81 reaches or falls below a preset pressure, the controller 82 outputs an actuation command to the third inverter 40 to actuate the third electric motor 25. Thereby, the second hydraulic pump 27 (the third electric motor 25) is actuated for steering operation. In other words, the controller 82 prohibits actuation of the second hydraulic pump 27 (the third electric motor 25) for steering operation, when the accumulator pressure is higher than the preset pressure. This preset pressure is a lower limit pressure at which the pressure oil can be supplied from the accumulator 71 to the steering hydraulic system (i.e., at which steering operation can be performed by the pressure oil of the accumulator 71). A specific value of the preset pressure shall be set as appropriate through desk calculation or a test.

The other parts of the configuration are the same as those of Embodiment 1 described above.

As described above, in the hybrid forklift of Embodiment 4: the accumulator 71 is provided to the hydraulic line 41 through which pressure oil is supplied from the second hydraulic pump 27 to the steering hydraulic system and the like. Accordingly, by supplying the pressure oil stored in the accumulator 71 to the steering hydraulic system, steering operation can be performed without having to actuate the second hydraulic pump 27 (the third electric motor 25) for the steering operation. This makes it possible to reduce the frequency of actuation of the second hydraulic pump 27 (the third electric motor 25) and improve the energy efficiency (fuel consumption) to a further extent.

In addition, in the hybrid forklift of Embodiment 4, the controller 82 monitors the accumulator pressure by receiving the pressure detection signals of the accumulator pressure gauge 81, and actuates the second hydraulic pump 27 (the third electric motor 25) for the steering operation only when the accumulator pressure detected by the accumulator pressure gauge 81 reaches or falls below the preset pressure.

Accordingly, the second hydraulic pump 27 (the third electric motor 25) can be actuated automatically only when it is needed to for steering operation (i.e., only when the accumulator pressure reaches or falls below the preset pressure).

Embodiment 5

Figure 6:
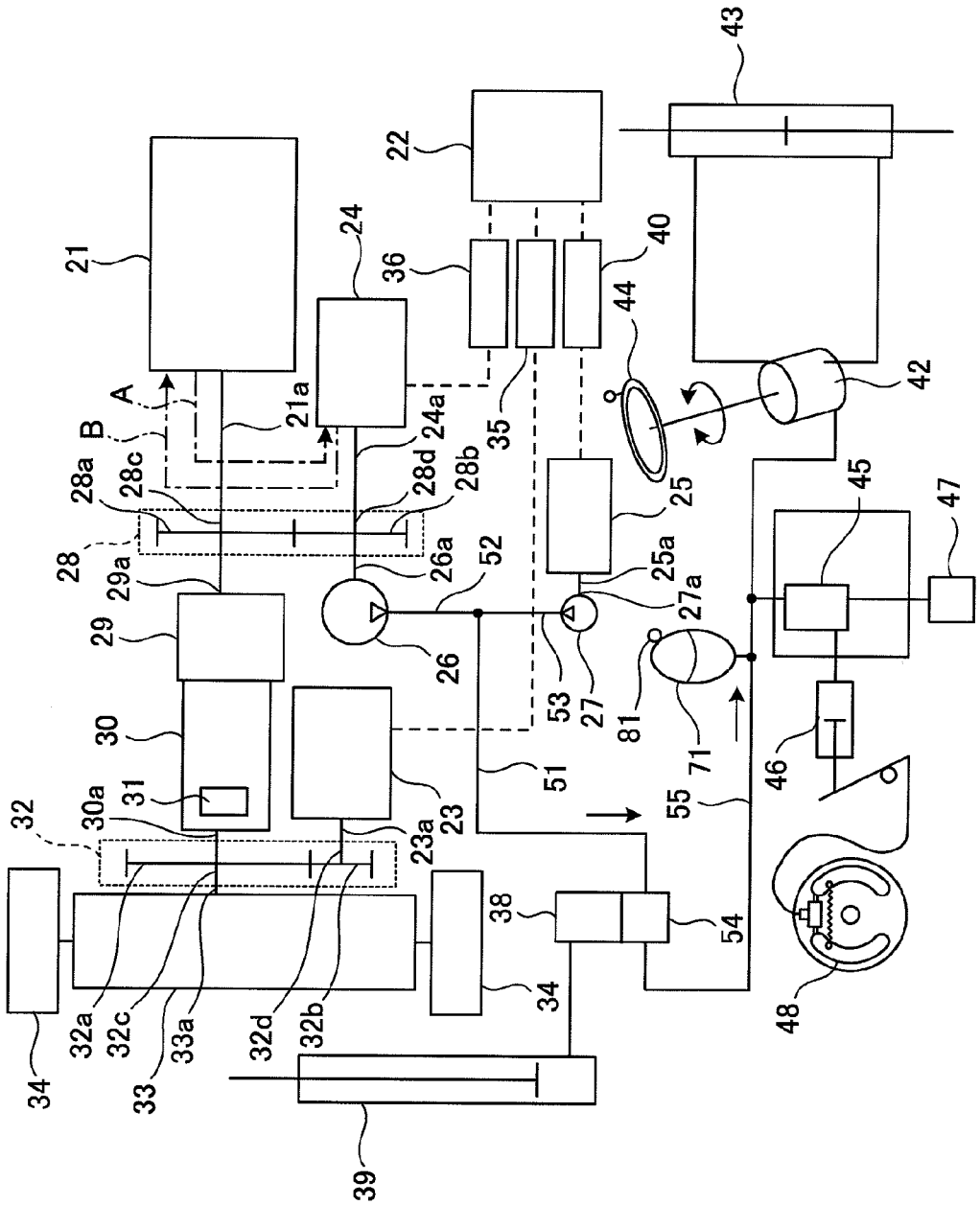
FIG. 6 is a configuration diagram of a drive system of a hybrid forklift according to Embodiment 5 of the present invention.

FIG. 6 is a configuration diagram of a drive system of a hybrid forklift according to Embodiment 5 of the present invention. Note that a control block diagram regarding an accumulator pressure of the hybrid forklift is the same as that in FIG. 5 and thus description will be provided by referring to FIG. 5. Also, in FIG. 6, the same components as those in Embodiment 2 described above. (see FIG. 2) are denoted by the same reference numerals, and the duplicated description thereof will not be provided in detail.

As shown in FIG. 6, in the hybrid forklift of Embodiment 5, the accumulator 71 is provided to the hydraulic line 55 through which pressure oil from the hydraulic line 51 shared by the first and second hydraulic pumps 26 and 27 is supplied to the steering hydraulic system (the steering valve 42 and the second hydraulic cylinder 43).

Thus, while pressure oil is being supplied to the steering hydraulic system from the second hydraulic pump 27 through the hydraulic line 41 by rotationally driving the second hydraulic pump 27 with the third electric motor 25, and while pressure oil is being supplied to the steering hydraulic system from the first hydraulic pump 26 by rotationally driving the first pump 26 with the engine 21 or the second electric motor 24, part of the pressure oil is stored (the hydraulic pressure is accumulated) in the accumulator 71. Therefore, even when the first hydraulic pump 26 (the engine 21 and the second electric motor 24) and the second hydraulic pump 27 (the third electric motor 25) are stopped, steering operation is possible since the pressure oil stored in the accumulator 71 can be supplied to the steering hydraulic system.

Moreover, the accumulator 71 is provided with the accumulator pressure gauge 81 to detect the pressure inside the accumulator 71 (accumulator pressure). As shown in FIG. 5, the controller 82 monitors the pressure in the accumulator 71 by receiving the pressure detection signals of the accumulator pressure gauge 81. Then, when the accumulator pressure detected by the accumulator pressure gauge 81 reaches or falls below a preset pressure, the controller 82 outputs an actuation command to the third inverter 40 to actuate the third electric motor 25. Thereby, the second hydraulic pump 27 (the third electric motor 25) is actuated for steering operation. In other words, the controller 82 prohibits actuation of the second hydraulic pump 27 (the third electric motor 25) for steering operation, when the accumulator pressure is higher than the preset pressure. This preset pressure is a lower limit pressure at which the pressure oil can be supplied from the accumulator 71 to the steering hydraulic system (i.e., at which steering operation can be performed by the pressure oil of the accumulator 71). A specific value of the preset pressure shall be set as appropriate through desk calculation or a test.

The other parts of the configuration are the same as those of Embodiment 2 described above.

As described above, in the hybrid forklift of Embodiment 5: the accumulator 71 is provided to the hydraulic line 55 through which pressure oil from the shared hydraulic line 51 is supplied to the steering hydraulic system and the like. Accordingly, by supplying the pressure oil stored in the accumulator 71 to the steering hydraulic system, steering operation can be performed without having to actuate the second hydraulic pump 27 (the third electric motor 25) for the steering operation. This makes it possible to reduce the frequency of actuation of the second hydraulic pump 27 (the third electric motor 25) and improve the energy efficiency (fuel consumption) to a further extent.

In addition, in the hybrid forklift of Embodiment 5, the controller 82 monitors the accumulator pressure by receiving the pressure detection signals of the accumulator pressure gauge 81, and actuates the second hydraulic pump 27 (the third electric motor 25) for the steering operation only when the accumulator pressure detected by the accumulator pressure gauge 81 reaches or falls below the preset pressure. Accordingly, the second hydraulic pump 27 (the third electric motor 25) can be actuated automatically only when it is needed to for steering operation (i.e., only when the accumulator pressure reaches or falls below the preset pressure).

Embodiment 6

Figure 7:
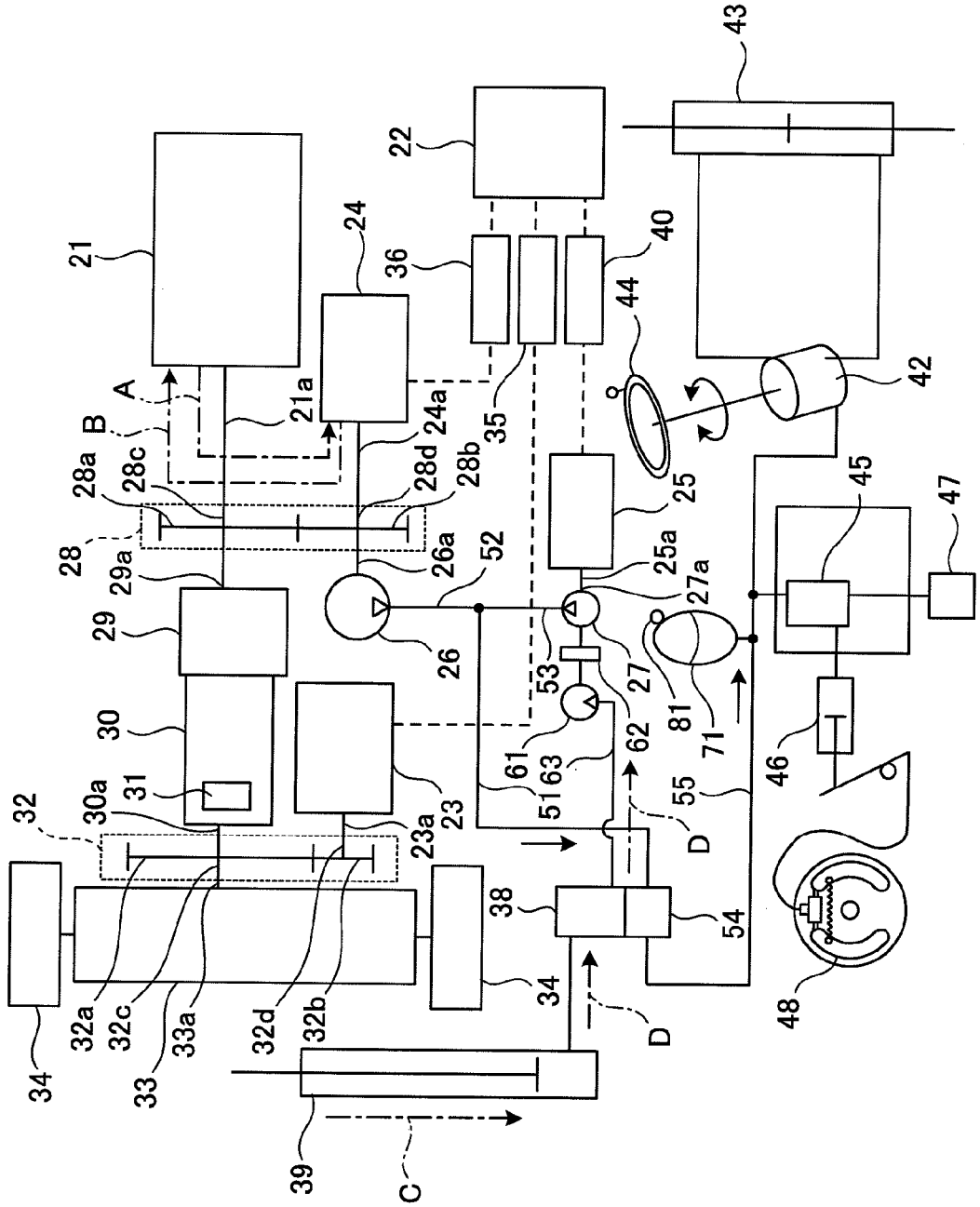
FIG. 7 is a configuration diagram of a drive system of a hybrid forklift according to Embodiment 6 of the present invention.

FIG. 7 is a configuration diagram of a drive system of a hybrid forklift according to Embodiment 6 of the present invention. Note that a control block diagram regarding an accumulator pressure of the hybrid forklift is the same as that in FIG. 5 and thus description will be provided by referring to FIG. 5. Also, in FIG. 7, the same components as those in Embodiment 3 described above (see FIG. 3) are denoted by the same reference numerals, and the duplicated description thereof will not be provided in detail.

As shown in FIG. 7, in the hybrid forklift of Embodiment 6, the accumulator 71 is provided to the hydraulic line 55 through which pressure oil from the hydraulic line 51 shared by the first and second hydraulic pumps 26 and 27 is supplied to the steering hydraulic system (the steering valve 42 and the second hydraulic cylinder 43), as in the case of Embodiment 5 described above.

Thus, while pressure oil is being supplied to the steering hydraulic system from the second hydraulic pump 27 through the hydraulic line 41 by rotationally driving the second hydraulic pump 27 with the third electric motor 25, and while pressure oil is being supplied to the steering hydraulic system from the first hydraulic pump 26 by rotationally driving the first pump 26 with the engine 21 or the second electric motor 24, part of the pressure oil is stored (the hydraulic pressure is accumulated) in the accumulator 71. Therefore, even when the first hydraulic pump 26 (the engine 21 and the second electric motor 24) and the second hydraulic pump 27 (the third electric motor 25) are stopped, steering operation is possible since the pressure oil stored in the accumulator 71 can be supplied to the steering hydraulic system.

Moreover, the accumulator 71 is provided with the accumulator pressure gauge 81 to detect the pressure inside the accumulator 71 (accumulator pressure). As shown in FIG. 5, the controller 82 monitors the pressure in the accumulator 71 by receiving the pressure detection signals of the accumulator pressure gauge 81. Then, when the accumulator pressure detected by the accumulator pressure gauge 81 reaches or falls below a preset pressure, the controller 82 outputs an actuation command to the third inverter 40 to actuate the third electric motor 25. Thereby, the second hydraulic pump 27 (the third electric motor 25) is actuated for steering operation. In other words, the controller 82 prohibits actuation of the second hydraulic pump 27 (the third electric motor 25) for steering operation, when the accumulator pressure is higher than the preset pressure. This preset pressure is a lower limit pressure at which the pressure oil can be supplied from the accumulator 71 to the steering hydraulic system (i.e., at which steering operation can be performed by the pressure oil of the accumulator 71). A specific value of the preset pressure shall be set as appropriate through desk calculation or a test.

The other parts of the configuration are the same as those of Embodiment 3 described above.

As described above, in the hybrid forklift of Embodiment 6: the accumulator 71 is provided to the hydraulic line 55 through which pressure oil is supplied from the shared hydraulic line 51 to the steering hydraulic system and the like. Accordingly, by supplying the pressure oil stored in the accumulator 71 to the steering hydraulic system, steering operation can be performed without having to actuate the second hydraulic pump 27 (the third electric motor 25) for the steering operation. This makes it possible to reduce the frequency of actuation of the second hydraulic pump 27 (the third electric motor 25) and improve the energy efficiency (fuel consumption) to a further extent.

In addition, in the hybrid forklift of Embodiment 6, the controller 82 monitors the accumulator pressure by receiving the pressure detection signals of the accumulator pressure gauge 81, and actuates the second hydraulic pump 27 (the third electric motor 25) for the steering operation only when the accumulator pressure detected by the accumulator pressure gauge 81 reaches or falls below the preset pressure. Accordingly, the second hydraulic pump 27 (the third electric motor 25) can be actuated automatically only when it is needed to for steering operation (i.e., only when the accumulator pressure reaches or falls below the preset pressure).

Embodiment 7

Figure 8:
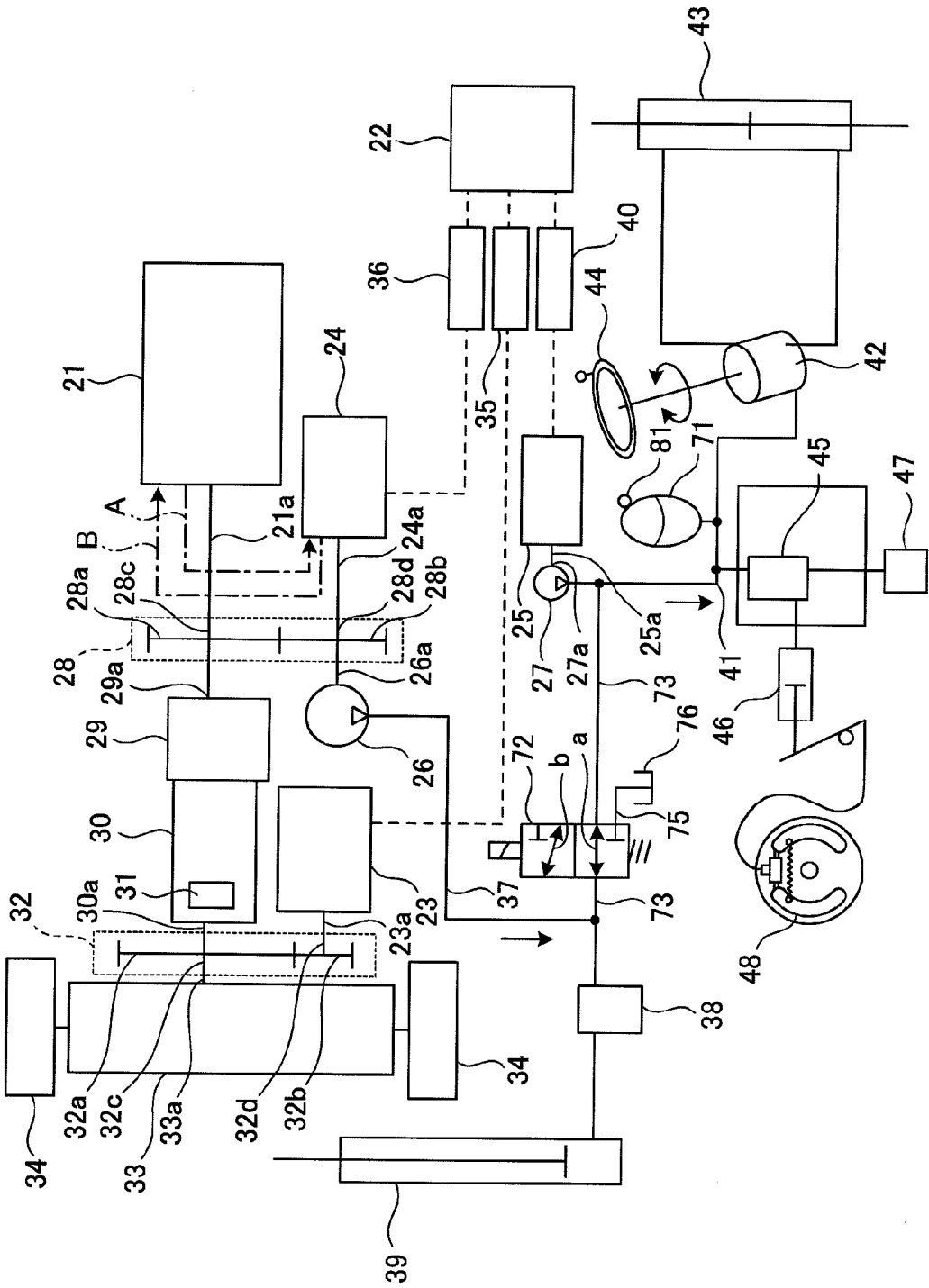
FIG. 8 is a configuration diagram of a drive system of a hybrid forklift according to Embodiment 7 of the present invention.
Figure 10:
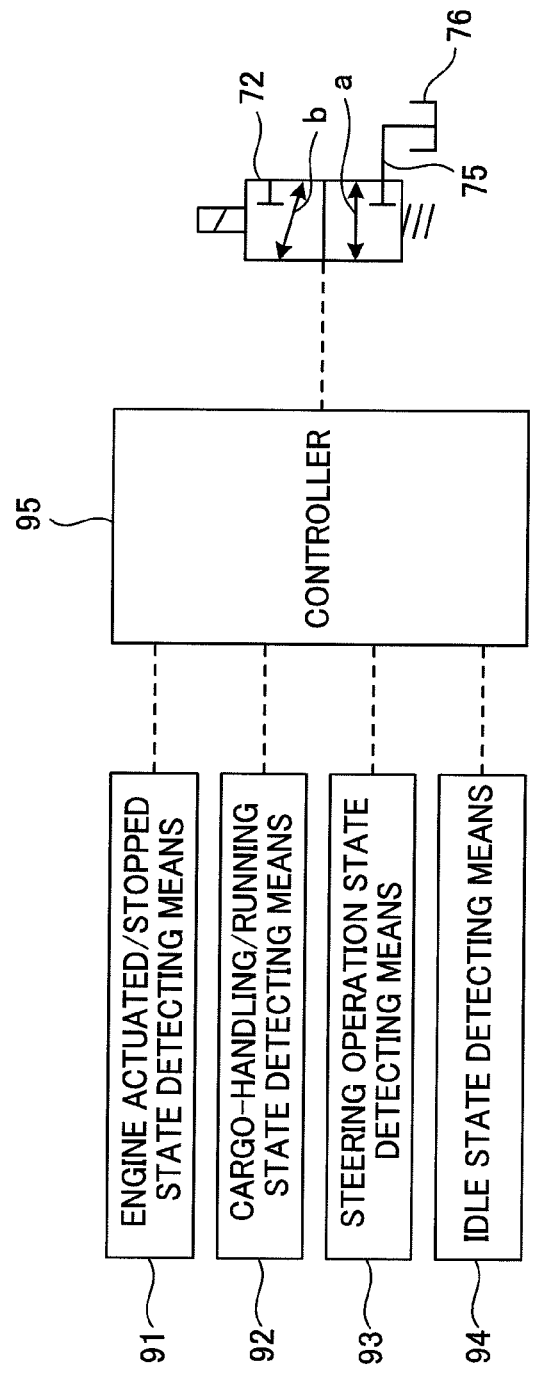
FIG. 10 is a control block diagram regarding a valve control of the hybrid forklift.

FIG. 8 is a configuration diagram of a drive system of a hybrid forklift according to Embodiment 7 of the present invention. FIG. 9 is a diagram showing a table listing valve operation conditions. FIG. 10 is a control block diagram regarding valve control of the hybrid forklift. Note that, in FIG. 8, the same components as those in Embodiment 4 described above (see FIGS. 4 and 5) are denoted by the same reference numerals, and the duplicated description thereof will not be provided in detail. Meanwhile, FIG. 9 shows the valve operation conditions in the case of Embodiment 7 as well as valve operation conditions in the cases of Embodiments 8 to 10 to be described later.

As shown in FIG. 8, in the hybrid forklift of Embodiment 7, the first hydraulic line 37, through which pressure oil is supplied from the first hydraulic pump 26 to the cargo-handling hydraulic system (the control valve 38 and the first hydraulic cylinder 39), and the second hydraulic line 41, through which pressure oil is supplied from the second hydraulic pump 27 to the steering hydraulic system (the steering valve 42 and the second hydraulic cylinder 43), are connected to each other by a third hydraulic line 73.

This third hydraulic line 73 is provided with a directional control valve 72. The directional control valve 72 is a valve capable of switching between a first state a where the first hydraulic line 37 is allowed to communicate with the second hydraulic line 41 and a second state b where the first hydraulic line 37 is allowed to communicate with a fourth hydraulic line 75 communicating with an oil tank 76.

While the directional control valve 72 is in the first state a, the pressure oil discharged from the first hydraulic pump 26 to the first hydraulic line 37 is supplied not only to the cargo-handling hydraulic system but also to the steering hydraulic system and a braking hydraulic system through the directional control valve 72, the third hydraulic line 73 and the second hydraulic line 41. In addition, the pressure oil discharged from the second hydraulic pump 27 to the second hydraulic line 41 is supplied not only to the steering hydraulic system and the braking hydraulic system but also to the cargo-handling hydraulic system through the directional control valve 72, the third hydraulic line 73 and the first hydraulic line 37.

While the directional control valve 72 is in the second state b, pressure oil discharged from the first hydraulic pump 26 to the first hydraulic line 37 is returned to the oil tank 76 through the directional control valve 72, the third hydraulic line 73 and the fourth hydraulic line 75. In this event, the load of the hydraulic systems on the first hydraulic pump 26 becomes very small, and therefore the discharge pressure of the first hydraulic pump 26 hardly rises and becomes very low.

Selecting (switching) between the states a and b of the directional control valve 72 are performed as shown in the column of "Embodiment 7" in the valve operation condition table in FIG. 9. The selecting (switching) is performed automatically by using a controller 95 shown in FIG. 10. As shown in FIG. 10, the controller 95 receives a detection signal of engine actuated/stopped state detecting means 91, a detection signal of cargo-handling/running state detecting means 92, a detection signal of steering operation state detecting means 93, and a detection signal of idle state detecting means 94.

The engine actuated/stopped state detecting means 91 detects whether the engine 21 is actuated or stopped (i.e., during idling stop). An engine revolution sensor that detects the number of revolutions of the engine 21 can be used as the engine actuated/stopped state detecting means 91, for example.

The cargo-handling/running state detecting means 92 detects when the hybrid forklift is in a cargo-handling state and also when the hybrid forklift is in a running state. For the cargo-handling state detection, it is possible to use a cargo-handling sensor that detects the operating state of a cargo-handling lever used to perform cargo-handling operations (lifting up and down) of the fork, or the like, for example. For the running state detection, it is possible to use a vehicle speed sensor or the like, for example.

The steering operation state detecting means 93 detects when the operator performs steering operation. As the steering operation state detecting means 93, it is possible to use a steering wheel sensor that detects the operating state of the steering wheel 44, a steering angle sensor that detects the steering angles of the steered wheels (rear wheels), or the like, for example.

The idle state detecting means 94 detects when the engine 21 is in an idle state. As the idle state detecting means 94, it is possible to use an accelerator pedal sensor that detects the amount of the accelerator pedal depressed and an engine revolution sensor, for example. In this case, the idle state detecting means 94 determines the vehicle is in the idle state, for example when the number of revolutions of the engine, which is detected by the engine revolution sensor, is not zero (i.e., the engine is actuated) and also when the amount of the accelerator pedal depressed, which is detected by the accelerator pedal sensor, is zero.

Then, the controller 95 selects (switches) between the states a and b of the directional control valve 72 as shown in the column of "Embodiment 7" in FIG. 9, on the basis of the detection signals of the respective detecting means 91 to 94.

The selecting is performed as follows when the engine is determined as being actuated on the basis of the detection signal of the engine actuated/stopped state detecting means 91. Specifically, if the vehicle is determined as being in a cargo-handling/running state on the basis of the detection signal of the cargo-handling/running state detecting means 92, the first state a is selected so that pressure oil discharged from the first hydraulic pump 26 may be supplied securely to the cargo-handling hydraulic system.

Meanwhile, any one of the first state a and the second state b is selected if the vehicle is determined as being in a steering operation state on the basis of the detection signal of the steering operation state detecting means 93. Specifically, in this case, the first state a may be selected so that pressure oil discharged from the first hydraulic pump 26 rotationally driven by the engine 21 in an actuated state may be used for steering operation, or the second state b may be selected so that only pressure oil discharged from the second hydraulic pump 27 may be used for the steering operation.

The second state b is selected if the vehicle is determined as being in the idle state on the basis of the detection signal of the idle state detecting means 94, i.e., if the first hydraulic pump 26 would otherwise be rotationally driven wastefully by the engine 21 without cargo-handling the like being performed. In this way, wasteful power consumption is prevented.

The selecting is performed as follows when the engine is determined as being in the idling stop state (engine is determined as being stopped) on the basis of the detection signal of the engine actuated/stopped state detecting means 91.

Specifically, if the vehicle is determined as being in the cargo-handling/running state on the basis of the detection signal of the cargo-handling/running state detecting means 92, the first state a is selected so that pressure oil discharged from the first hydraulic pump 26 may be supplied securely to the cargo-handling hydraulic system.

Meanwhile, the second state b is selected if the vehicle is determined as being in the steering operation state on the basis of the detection signal of the steering operation state detecting means 93. In this case, pressure oil discharged from the second hydraulic pump 27 is used for steering operation.

The other parts of the configuration are the same as those of Embodiment 4 described above.

As described above, in the hybrid forklift of Embodiment 7: the first hydraulic line 37 through which pressure oil is supplied from the first hydraulic pump 26 to the cargo-handling hydraulic system and the second hydraulic line 41 through which pressure oil is supplied from the second hydraulic pump 27 to the steering hydraulic system are connected to each other by the third hydraulic line 73; and the third hydraulic line 73 is provided with the directional control valve 72 switchable between the first state a of allowing the first hydraulic line 37 to communicate with the second hydraulic line 41 and the second state b of allowing the first hydraulic line 37 to communicate with the fourth hydraulic line 75 communicating with the oil tank 76. Accordingly, by switching the directional control valve 72 to the second state b if the first hydraulic pump 26 would otherwise be rotationally driven wastefully by the engine 21 in an idle state or the like, pressure oil discharged from the first hydraulic pump 26 is caused to flow into the oil tank 76 so that the discharge pressure of the first hydraulic pump 26 can hardly rise. This makes it possible to reduce wasteful power consumption and improve the fuel consumption to a further extent.

Moreover, in the hybrid forklift of Embodiment 7, the controller 95 can perform automatic switching (selecting) between the states a and b of the directional control valve 73 on the basis of the detection signals of the respective detecting means 91 to 94.

Embodiment 8

Figure 11:
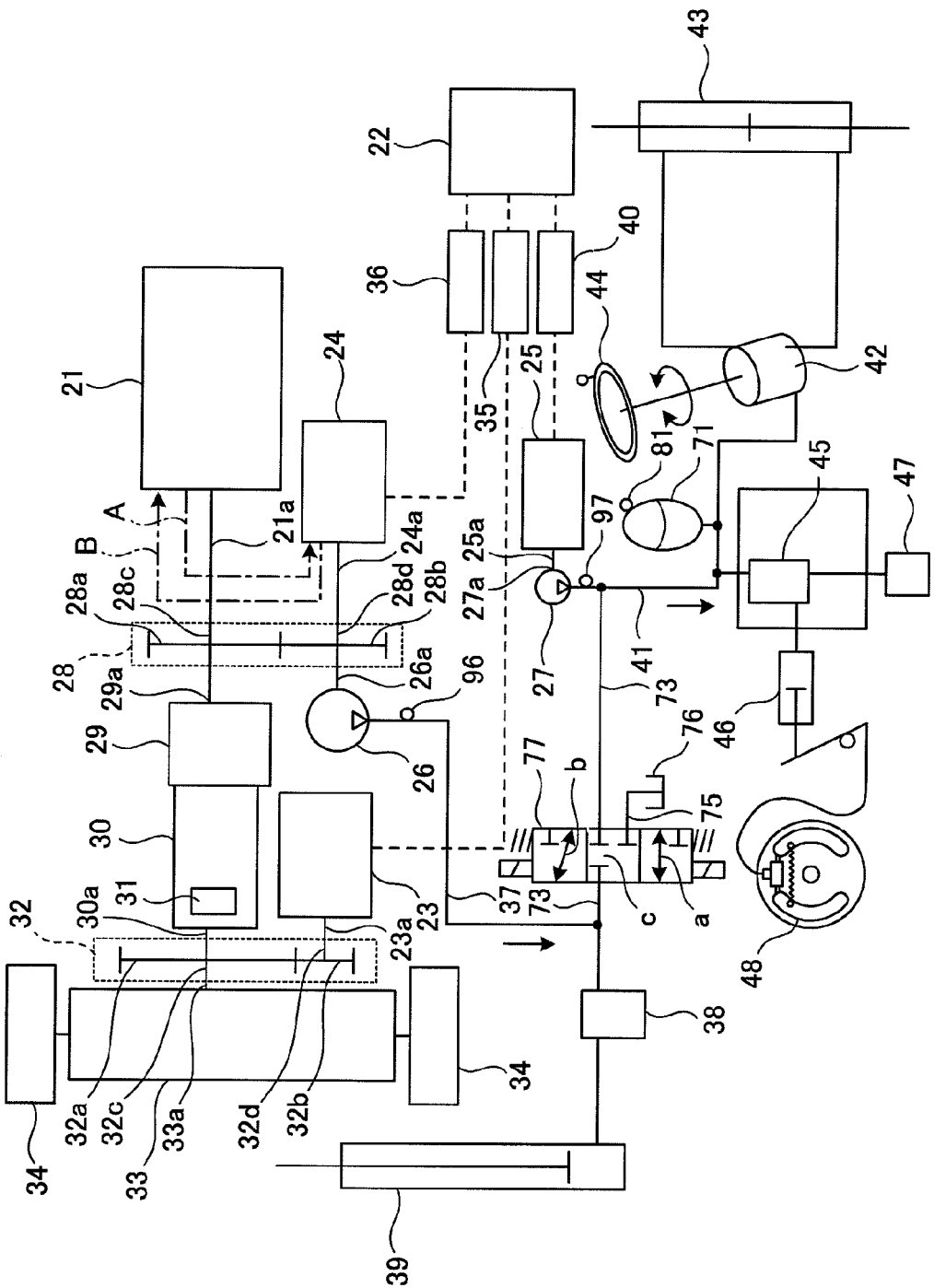
FIG. 11 is a configuration diagram of a drive system of a hybrid forklift according to Embodiment 8 of the present invention.
Figure 12:
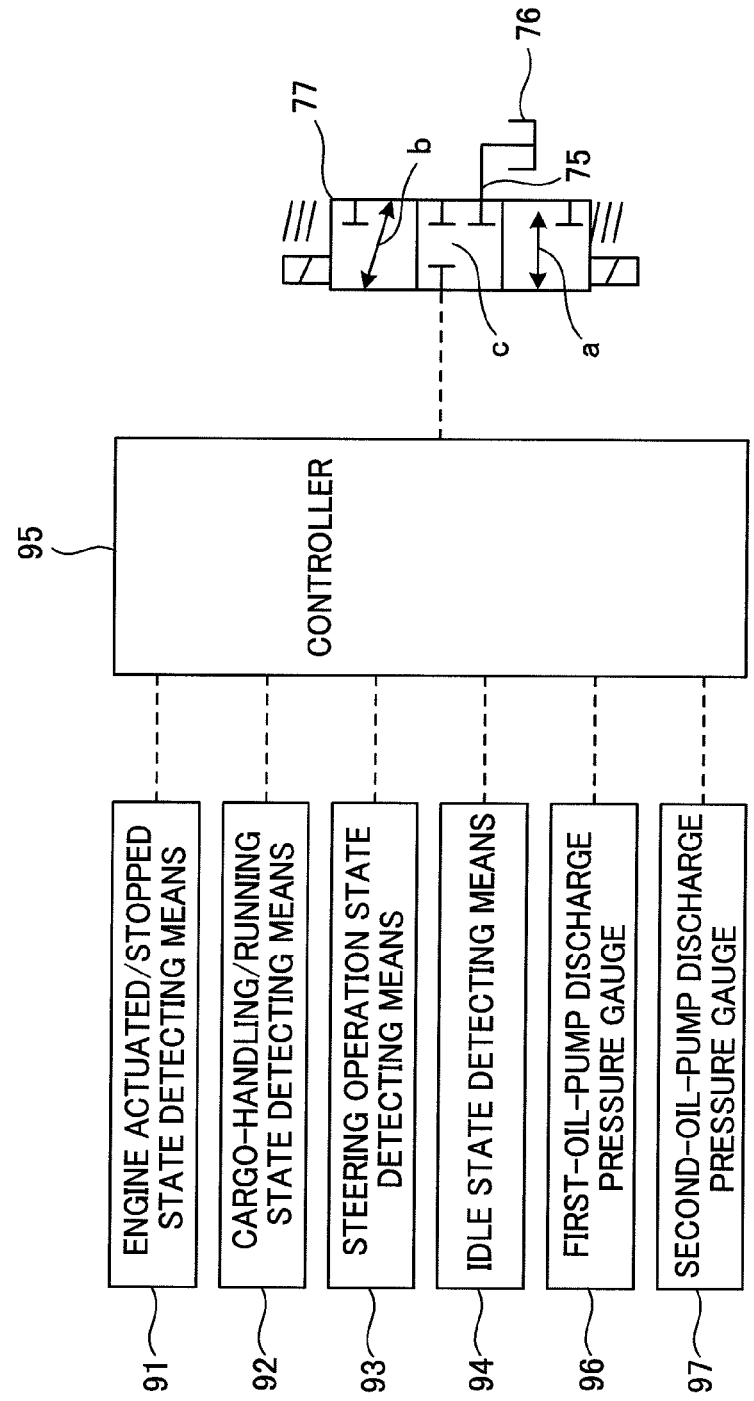
FIG. 12 is a control block diagram regarding a valve control of the hybrid forklift.

FIG. 11 is a configuration diagram of a drive system of a hybrid forklift according to Embodiment 8 of the present invention. FIG. 12 is a control block diagram regarding valve control of the hybrid forklift. Note that, in FIG. 11, the same components as those in Embodiment 7 described above (see FIG. 8) are denoted by the same reference numerals, and the duplicated description thereof will not be provided in detail.

As shown in FIG. 11, the hybrid forklift of Embodiment 8 has the configuration of Embodiment 7 described above (FIG. 8) but it includes a directional control valve 77 instead of the directional control valve 72.

Specifically, the first hydraulic line 37, through which pressure oil is supplied from the first hydraulic pump 26 to the cargo-handling hydraulic system (the control valve 38 and the first hydraulic cylinder 39), and the second hydraulic line 41, through which pressure oil is supplied from the second hydraulic pump 27 to the steering hydraulic system (the steering valve 42 and the second hydraulic cylinder 43), are connected to each other by the third hydraulic line 73. This third hydraulic line 73 is provided with the directional control valve 77. The directional control valve 77 is a valve capable of switching among the first state a where the first hydraulic line 37 is allowed to communicate with the second hydraulic line 41, the second state b where the first hydraulic line 37 is allowed to communicate with the fourth hydraulic line 75 communicating with the oil tank 76, and, additionally, a third state c where flows among the first hydraulic line 37, the second hydraulic line 41 and the fourth hydraulic line 75 are blocked.

While the directional control valve 77 is in the first state a, the pressure oil discharged from the first hydraulic pump 26 to the first hydraulic line 37 is supplied not only to the cargo-handling hydraulic system but also to the steering hydraulic system and the braking hydraulic system through the directional control valve 77, the third hydraulic line 73 and the second hydraulic line 41. In addition, the pressure oil discharged from the second hydraulic pump 27 to the second hydraulic line 41 is supplied not only to the steering hydraulic system and the braking hydraulic system but also to the cargo-handling hydraulic system through the directional control valve 77, the third hydraulic line 73 and the first hydraulic line 37.

While the directional control valve 77 is in the second state b, pressure oil discharged from the first hydraulic pump 26 to the first hydraulic line 37 is returned to the oil tank 76 through the directional control valve 77, the third hydraulic line 73 and the fourth hydraulic line 75. In this event, the load of the hydraulic systems on the first hydraulic pump 26 becomes very small, and therefore the discharge pressure of the first hydraulic pump 26 hardly rises and becomes very low.

While the directional control valve 77 is in the third state c, pressure oil discharged from the first hydraulic pump 26 can be blocked in such a way not to flow into the second hydraulic line 41 and the fourth hydraulic line 75 (the oil tank 76) through the directional control valve 77. Pressure oil discharged from the second hydraulic pump 27 may also be blocked in such a way not to flow into the first hydraulic line 37 and the fourth hydraulic line 75 (the oil tank 76) through the directional control valve 77.

Selecting (switching) among the states a, b and c of the directional control valve 77 are performed as shown in the column of "Embodiment 8" in the valve operation condition table in FIG. 9. The selecting (switching) is performed automatically by using the controller 95 shown in FIG. 12. As shown in FIG. 12, the controller 95 receives the detection signal of the engine actuated/stopped state detecting means 91, the detection signal of the cargo-handling/running state detecting means 92, the detection signal of the steering operation state detecting means 93, the detection signal of the idle state detecting means 94, a detection signal of a first-hydraulic-pump discharge pressure gauge 96, and a second-hydraulic-pump discharge pressure gauge 97. The detecting means 91 to 94 are the same as those in FIG. 10, and the description thereof will not be provided here.

As shown in FIG. 11, the first-hydraulic-pump discharge pressure gauge 96 is provided to the first hydraulic line 37 and detects the discharge pressure of the first hydraulic pump 26. The second-hydraulic-pump discharge pressure gauge 97 is provided to the second hydraulic line 41 and detects the discharge pressure of the second hydraulic pump 27.

Then, the controller 95 selects (switches) between the states a and b of the directional control valve 77 as shown in the column of "Embodiment 8" in FIG. 9, on the basis of the detection signals of the respective detecting means 91 to 94 and the detection signals of the respective pressure gauges 96 and 97.

The selecting is performed as follows if the engine is determined as being actuated on the basis of the detection signal of the engine actuated/stopped state detecting means 91. Specifically, as in the case of Embodiment 7 described above, the first state a is selected if the vehicle is determined as being in the cargo-handling/running state on the basis of the detection signal of the cargo-handling/running state detecting means 92. Any one of the first state a and the second state b is selected if the vehicle is determined as being in the steering operation state on the basis of the detection signal of the steering operation state detecting means 93. The second state b is selected if the vehicle is determined as being in the idle state on the basis of the detection signal of the idle state detecting means 94.

The third state c is selected if the first-hydraulic-pump discharge pressure detected by the first-hydraulic-pump discharge pressure gauge 96 is higher than the second-hydraulic-pump discharge pressure detected by the second-hydraulic-pump discharge pressure gauge 97. This is because the first hydraulic line 37 sometimes requires a higher pressure than the second hydraulic line 41 depending on the amount of cargo loaded, and in that case, the third state c is selected to block certain oil flows. In this way, the pressure oil does not flow wastefully from the first hydraulic line 37 side to the second hydraulic line 41 side. Thus, wasteful power consumption is reduced and the fuel consumption is improved. In addition, the third state c is selected to block certain oil flows when only the second hydraulic pump 27 (i.e., the third electric motor 25) is actuated to supply pressure oil to the steering hydraulic system and the braking hydraulic system with the first hydraulic pump 26 (i.e., the engine 21 and the second electric motor 25) being not actuated. In this way, part of the pressure oil can be prevented from flowing wastefully from the second hydraulic line 41 side to the first hydraulic line 37 side through the directional control valve 77.

The selecting is performed as follows if the engine is determined as being in the idling stop state (engine is determined as being stopped) on the basis of the detection signal of the engine actuated/stopped state detecting means 91.

Specifically, as in the case of Embodiment 7 described above, the first state a is selected if the vehicle is determined as being in the cargo-handling/running state on the basis of the detection signal of the cargo-handling/running state detecting means 92. The second state b is selected if the vehicle is determined as being in the steering operation state on the basis of the detection signal of the steering operation state detecting means 93.

The third state c is selected if the first-hydraulic-pump discharge pressure detected by the first-hydraulic-pump discharge pressure gauge 96 is higher than the second-hydraulic-pump discharge pressure detected by the second-hydraulic-pump discharge pressure gauge 97. As described above, this is because the first hydraulic line 37 sometimes requires a higher pressure than the second hydraulic line 41 depending on the amount of cargo loaded, and in that case, the third state c is selected to block certain oil flows. In this way, the pressure oil does not flow wastefully from the first hydraulic line 37 side to the second hydraulic line 41 side. Thus, wasteful power consumption is reduced and the fuel consumption is improved. In addition, as described above, the third state c is selected to block certain oil flows when only the second hydraulic pump 27 (i.e., the third electric motor 25) is actuated to supply pressure oil to the steering hydraulic system and the braking hydraulic system with the first hydraulic pump 26 (i.e., the engine 21 and the second electric motor 25) being not actuated. In this way, part of the pressure oil can be prevented from flowing wastefully from the second hydraulic line 41 side to the first hydraulic line 37 side through the directional control valve 77.

The other parts of the configuration are the same as those of Embodiment 7 described above.

As described above, in the hybrid forklift of Embodiment 8: the first hydraulic line 37 through which pressure oil is supplied from the first hydraulic pump 26 to the cargo-handling hydraulic system and the second hydraulic line 41 through which pressure oil is supplied from the second hydraulic pump 27 to the steering hydraulic system are connected to each other by the third hydraulic line 73; and the third hydraulic line 73 is provided with the directional control valve 77 switchable among the first state a of allowing the first hydraulic line 37 to communicate with the second hydraulic line 41, the second state b of allowing the first hydraulic line 37 to communicate with the fourth hydraulic line 75 communicating with the oil tank 76, and the third state c of blocking the flows among the first hydraulic line 37, the second hydraulic line 41 and the fourth hydraulic line 75. Accordingly, when the first hydraulic line 37 requires a higher pressure than the second hydraulic line 41 depending on the amount of cargo loaded, the third state c of the directional control valve 77 is selected to block certain oil flows so that the pressure oil may not flow wastefully from the first hydraulic line 37 side to the second hydraulic line 41 side. In this way, wasteful power consumption is reduced and the fuel consumption is improved. In addition, the third state c of the directional control valve 77 is selected to block certain oil flows when only the second hydraulic pump 27 (i.e., the third electric motor 25) is actuated to supply pressure oil to the steering hydraulic system with the first hydraulic pump 26 (i.e., the engine 21 and the second electric motor 25) being not actuated. In this way, part of the pressure oil may be prevented from flowing wastefully from the second hydraulic line 41 side to the first hydraulic line 37 side through the directional control valve 77.

Moreover, in the hybrid forklift of Embodiment 8, the controller 95 can perform automatic switching (selecting) among the states a, b and c of the directional control valve 77 on the basis of the detection signals of the respective detecting means 91 to 94 and pressure gauges 96 and 97.

Embodiment 9

Figure 13:
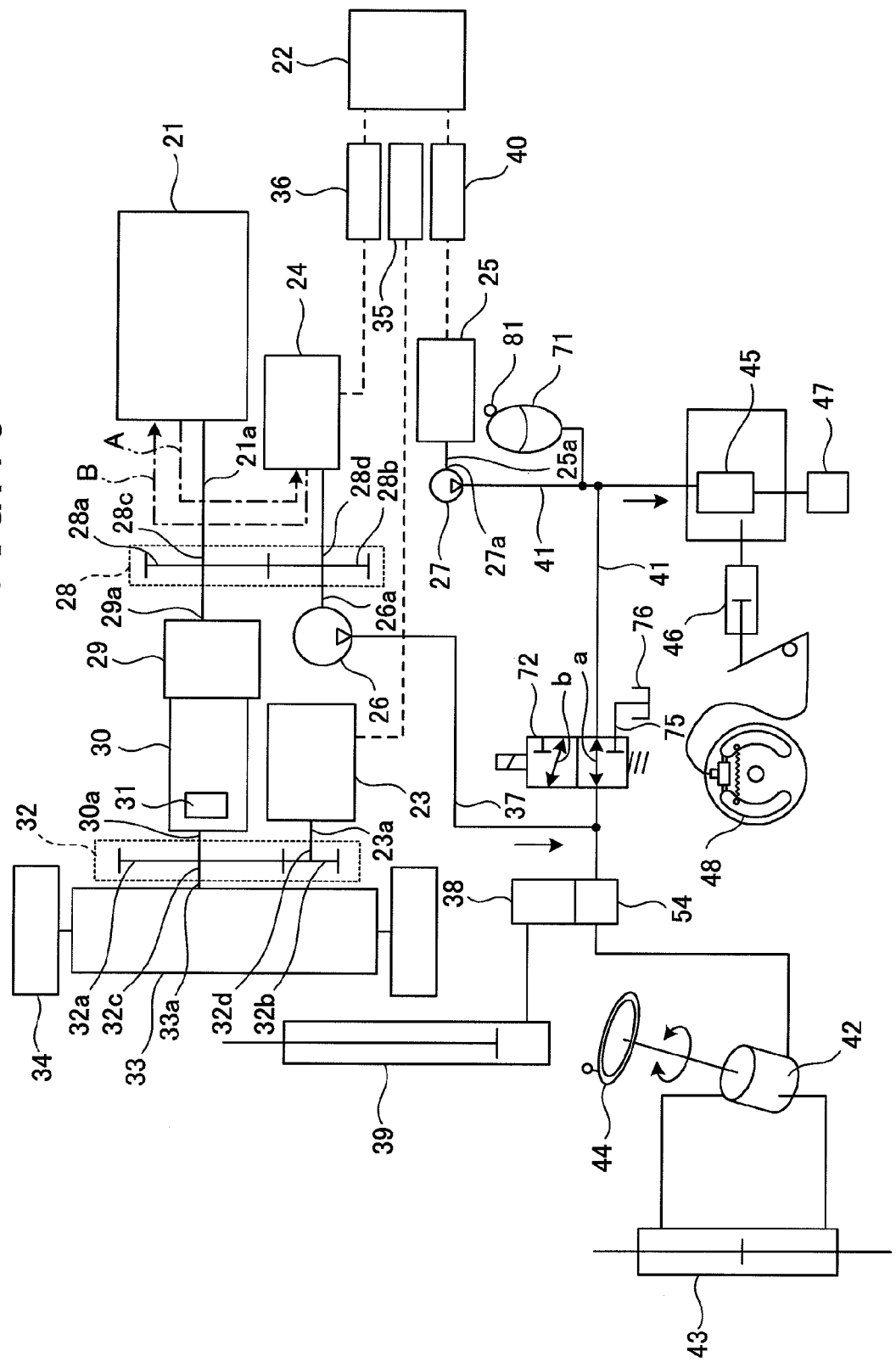
FIG. 13 is a configuration diagram of a drive system of a hybrid forklift according to Embodiment 9 of the present invention.

FIG. 13 is a configuration diagram of a drive system of a hybrid forklift according to Embodiment 9 of the present invention. Note that a control block diagram regarding valve control of the hybrid forklift is the same as that in FIG. 10, and thus description will be provided by referring to FIG. 10. Also, in FIG. 13, the same components as those in Embodiment 4 described above (see FIGS. 4 and 5) are denoted by the same reference numerals, and the duplicated description thereof will not be provided in detail.

The configuration is as follows. As shown in FIG. 13, the first and second hydraulic lines 37 and 41 are connected to each other through the directional control valve 72. Thus, pressure oil discharged from the first hydraulic pump 26 to the first hydraulic line 37 and pressure oil discharged from the second hydraulic pump 27 to the second hydraulic line 41 are merged, and then supplied to the cargo-handling hydraulic system (the control valve 38 and the first hydraulic cylinder 39) and the steering hydraulic system (the steering valve 42 and the second hydraulic cylinder 43) through the hydraulic valve 54.

The directional control valve 72 is a valve capable of switching between the first state a where the first hydraulic line 37 is allowed to communicate with the second hydraulic line 41 and the second state b where the first hydraulic line 37 is allowed to communicate with a third hydraulic line 75 communicating with the oil tank 76.

While the directional control valve 72 is in the first state a, the pressure oil discharged from the first hydraulic pump 26 to the first hydraulic line 37 can be supplied not only to the cargo-handling hydraulic system and the steering hydraulic system but also to the braking hydraulic system through the directional control valve 72 and the second hydraulic line 41. In addition, the pressure oil discharged from the second hydraulic pump 27 to the second hydraulic line 41 can be supplied to the braking hydraulic system as well as to the steering hydraulic system and the cargo-handling hydraulic system through the directional control valve 72, the second hydraulic line 41 and the first hydraulic line 37.

While the directional control valve 72 is in the second state b, pressure oil discharged from the first hydraulic pump 26 to the first hydraulic line 37 is returned to the oil tank 76 through the directional control valve 72, the second hydraulic line 41 and the third hydraulic line 75. In this event, the load of the hydraulic systems on the first hydraulic pump 26 becomes very small, and therefore the discharge pressure of the first hydraulic pump 26 hardly rises and becomes very low.

Selecting (switching) between the states a and b of the directional control valve 72 are performed as shown in the column of "Embodiment 9" in the valve operation condition table in FIG. 9. The selecting (switching) is performed automatically by using the controller 95 shown in FIG. 10. As shown in FIG. 10, the controller 95 receives the detection signal of the engine actuated/stopped state detecting means 91, the detection signal of the cargo-handling/running state detecting means 92, the detection signal of the steering operation state detecting means 93, and the detection signal of the idle state detecting means 94. The detecting means 91 to 94 are the same as those in Embodiment 7 described above, and the description thereof will not be provided here.

Then, the controller 95 selects (switches) between the states a and b of the directional control valve 72 as shown in the column of "Embodiment 9" in FIG. 9, on the basis of the detection signals of the respective detecting means 91 to 94.

The selecting is performed as follows when the engine is determined as being actuated on the basis of the detection signal of the engine actuated/stopped state detecting means 91.

Specifically, if the vehicle is determined as being in the cargo-handling/running state on the basis of the detection signal of the cargo-handling/running state detecting means 92, the first state a is selected so that pressure oil discharged from the first hydraulic pump 26 may be supplied securely to the cargo-handling hydraulic system.

The first state a is also selected if the vehicle is determined as being in the steering operation state on the basis of the detection signal of the steering operation state detecting means 93 so that pressure oil discharged from the first hydraulic pump 26 may be supplied securely to the steering hydraulic system.

The second state b is selected if the vehicle is determined as being in the idle state on the basis of the detection signal of the idle state detecting means 94, i.e., if the first hydraulic pump 26 would otherwise be rotationally driven wastefully by the engine 21 without cargo-handling and the like being performed. In this way, wasteful power consumption is prevented.

The selecting is performed as follows when the engine is determined as being in the idling stop state (engine is determined as being stopped) on the basis of the detection signal of the engine actuated/stopped state detecting means 91.

Specifically, if the vehicle is determined as being in the cargo-handling/running state on the basis of the detection signal of the cargo-handling/running state detecting means 92, the first state a is selected so that pressure oil discharged from the first hydraulic pump 26 may be supplied securely to the cargo-handling hydraulic system.

The first state b is selected if the vehicle is determined as being in the steering operation state on the basis of the detection signal of the steering operation state detecting means 93 so that pressure oil discharged from the first hydraulic pump 26 may be supplied securely to the steering hydraulic system, or so that pressure oil discharged from the second hydraulic pump 27 may be supplied to the steering hydraulic system. In this case, steering operation is performed by using pressure oil discharged from the first hydraulic pump 26 or pressure oil discharged from the second hydraulic pump 27.

The other parts of the configuration are the same as those of Embodiment 4 described above.

As described above, in the hybrid forklift of Embodiment 9: the first hydraulic line 37 is connected to the second hydraulic line 41 through the directional control valve 72 so that pressure oil, which is discharged from the first hydraulic pump 26 to the first hydraulic line 37, and pressure oil, which is discharged from the second hydraulic pump 27 to the second hydraulic line 41, can be merged, and then supplied to the cargo-handling hydraulic system and the steering hydraulic system; and the directional control valve 72 is switchable between the first state a of allowing the first hydraulic line 37 to communicate with the second hydraulic line 41 and the second state b of allowing the first hydraulic line 37 to communicate with the third hydraulic line 75 communicating with the oil tank 76. Accordingly, by switching the directional control valve 72 to the second state b if the first hydraulic pump 26 would otherwise be rotationally driven wastefully by the engine 21 in the idle state or the like, pressure oil discharged from the first hydraulic pump 26 is caused to flow into the oil tank 76 so that the discharge pressure of the first hydraulic pump 26 can hardly rise. This makes it possible to reduce wasteful power consumption and improve the fuel consumption to a further extent. In addition, when the directional control valve 72 is switched to the first state a, steering operation can be performed by using any of the first hydraulic pump 26 (the engine 21 and the second electric motor) and the second hydraulic pump 27 (the third electric motor 25).

Moreover, in the hybrid forklift of Embodiment 9, the controller 95 can perform automatic switching (selecting) between the states a and b of the directional control valve 73 on the basis of the detection signals of the respective detecting means 91 to 94.

Embodiment 10

Figure 14:
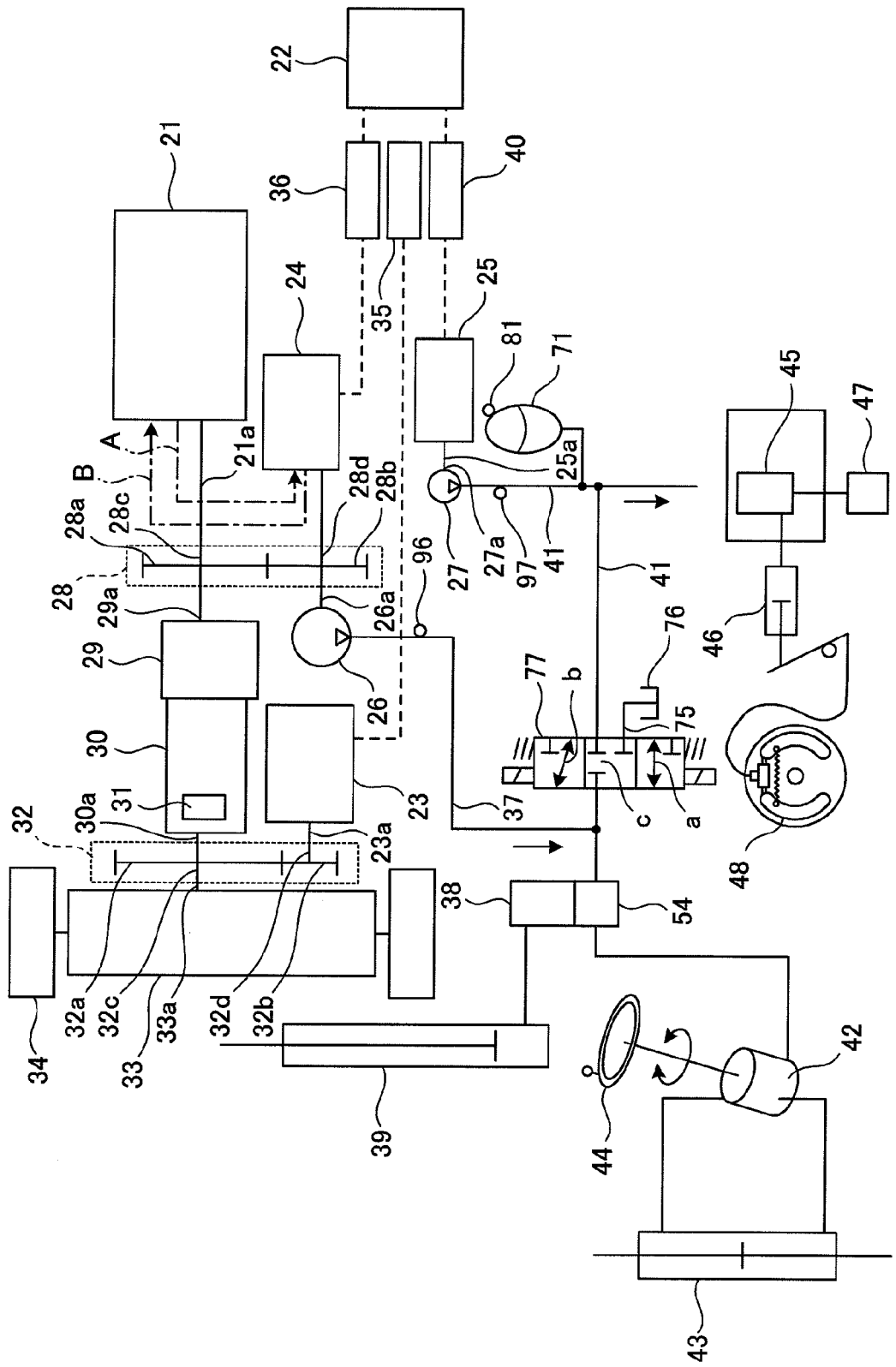
FIG. 14 is a configuration diagram of a drive system of a hybrid forklift according to Embodiment 10 of the present invention.
Figure 15:
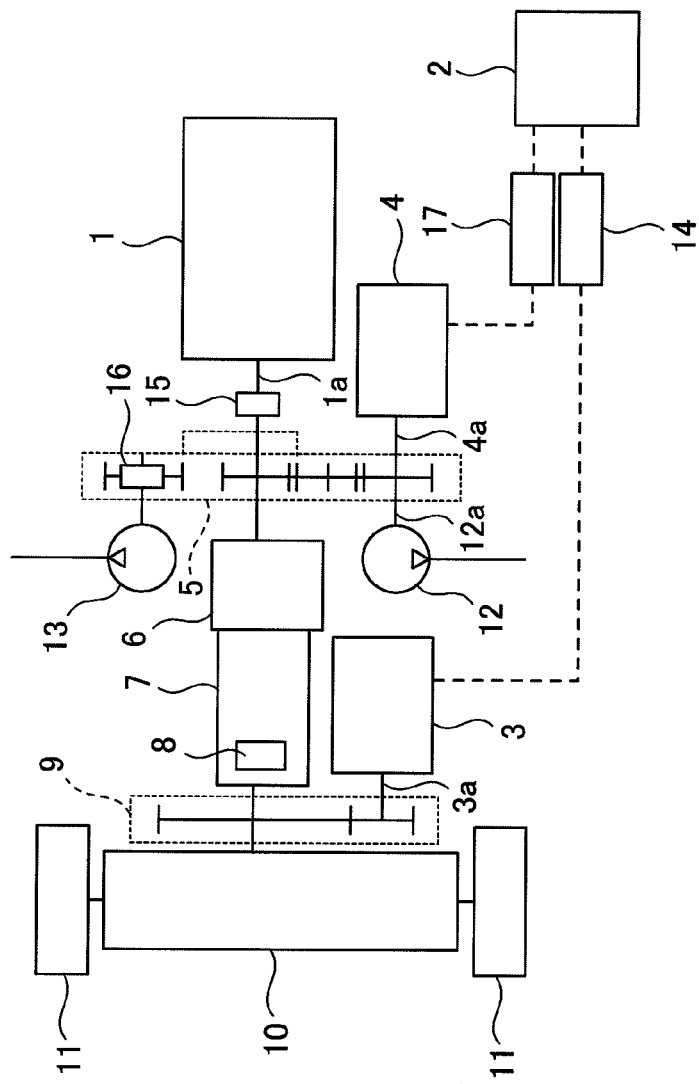
FIG. 15 is a configuration diagram of a drive system of a conventional hybrid forklift.

FIG. 14 is a configuration diagram of a drive system of a hybrid forklift according to Embodiment 10 of the present invention. Note that a control block diagram regarding valve control of the hybrid forklift is the same as that in FIG. 12, and thus description will be provided by referring to FIG. 12. Also, in FIG. 14, the same components as those in Embodiment 9 described above (see FIG. 13) are denoted by the same reference numerals, and the duplicated description thereof will not be provided in detail.

As shown in FIG. 14, the hybrid forklift of Embodiment 10 has the configuration of Embodiment 9 described above (FIG. 13) but it includes the directional control valve 77 instead of the directional control valve 72.

Specifically, the configuration is as follows. The first and second hydraulic lines 37 and 41 are connected to each other through the directional control valve 77. Thus, pressure oil discharged from the first hydraulic pump 26 to the first hydraulic line 37 and pressure oil discharged from the second hydraulic pump 27 to the second hydraulic line 41 are merged, and then supplied to the cargo-handling hydraulic system (the control valve 38 and the first hydraulic cylinder 39) and the steering hydraulic system (the steering valve 42 and the second hydraulic cylinder 43) through the hydraulic valve 54. The directional control valve 77 is a valve capable of switching among the first state a where the first hydraulic line 37 is allowed to communicate with the second hydraulic line 41, the second state b where the first hydraulic line 37 is allowed to communicate with the third hydraulic line 75 communicating with the oil tank 76, and the third state c where flows among the first hydraulic line 37, the second hydraulic line 41 and the third hydraulic line 75 are blocked.

While the directional control valve 77 is in the first state a, the pressure oil discharged from the first hydraulic pump 26 to the first hydraulic line 37 can be supplied not only to the cargo-handling hydraulic system and the steering hydraulic system but also to the braking hydraulic system through the directional control valve 72 and the second hydraulic line 41. In addition, the pressure oil discharged from the second hydraulic pump 27 to the second hydraulic line 41 can be supplied to the braking hydraulic system as well as to the steering hydraulic system and the cargo-handling hydraulic system through the directional control valve 72, the second hydraulic line 41 and the first hydraulic line 37.

While the directional control valve 77 is in the second state b, pressure oil discharged from the first hydraulic pump 26 to the first hydraulic line 37 is returned to the oil tank 76 through the directional control valve 72, the second hydraulic line 41 and the third hydraulic line 75. In this event, the load of the hydraulic systems on the first hydraulic pump 26 becomes very small, and therefore the discharge pressure of the first hydraulic pump 26 hardly rises and becomes very low.

While the directional control valve 77 is in the third state c, pressure oil discharged from the first hydraulic pump 26 can be blocked in such a way not to flow into the second hydraulic line 41 and the third hydraulic line 73 (the oil tank 26) through the directional control valve 77. Pressure oil discharged from the second hydraulic pump 27 may also be blocked in such a way not to flow into the first hydraulic line 37 and the third hydraulic line 73 (the oil tank 26) through the directional control valve 77.

Selecting (switching) among the states a, b and c of the directional control valve 77 are performed as shown in the column of "Embodiment 10" in the valve operation condition table in FIG. 9. The selecting (switching) is performed automatically by using the controller 95 shown in FIG. 12. As shown in FIG. 12, the controller 95 receives the detection signal of the engine actuated/stopped state detecting means 91, the detection signal of the cargo-handling/running state detecting means 92, the detection signal of the steering opera-tion state detecting means 93, the detection signal of the idle state detecting means 94, the detection signal of the first-hydraulic-pump discharge pressure gauge 96, and the second-hydraulic-pump discharge pressure gauge 97. The detecting means 91 to 94 and the pressure gauges 96 and 97 are the same as those mentioned in Embodiments 7 and 8 described above, and the description thereof will not be provided here.

Then, the controller 95 selects (switches) between the states a and b of the directional control valve 77 as shown in the column of "Embodiment 10" in FIG. 9, on the basis of the detection signals of the respective detecting means 91 to 94 and pressure gauges 96 and 97.

The selecting is performed as follows when the engine is determined as being actuated on the basis of the detection signal of the engine actuated/stopped state detecting means 91.

Specifically, as in the case of Embodiment 9 described above, the first state a is selected if the vehicle is determined as being in the cargo-handling/running state on the basis of the detection signal of the cargo-handling/running state detecting means 92. The first state a is also selected if the vehicle is determined as in the steering operation state on the basis of the detection signal of the steering operation state detecting means 93. The second state b is selected if the vehicle is determined as being in the idle state on the basis of the detection signal of the idle state detecting means 94.

The third state c is selected if the first-hydraulic-pump discharge pressure detected by the first-hydraulic-pump discharge pressure gauge 96 is higher than the second-hydraulic-pump discharge pressure detected by the second-hydraulic-pump discharge pressure gauge 97. This is because the first hydraulic line 37 sometimes requires a higher pressure than the second hydraulic line 41 depending on the amount of cargo loaded, and in that case, the third state c is selected to block certain oil flows. In this way, the pressure oil does not flow wastefully from the first hydraulic line 37 side to the second hydraulic line 41 side. Thus, wasteful power consumption is reduced and the fuel consumption is improved.

The selecting is performed as follows if the engine is determined as being in the idling stop state (engine is determined as being stopped) on the basis of the detection signal of the engine actuated/stopped state detecting means 91.

Specifically, as in the case of Embodiment 9 described above, the first state a is selected if the vehicle is determined as being in the cargo-handling/running state on the basis of the detection signal of the cargo-handling/running state detecting means 92. The second state b is selected if the vehicle is determined as being in the steering operation state on the basis of the detection signal of the steering operation state detecting means 93.

The third state c is selected if the first-hydraulic-pump discharge pressure detected by the first-hydraulic-pump discharge pressure gauge 96 is higher than the second-hydraulic-pump discharge pressure detected by the second-hydraulic-pump discharge pressure gauge 97. As described above, this is because the first hydraulic line 37 sometimes requires a higher pressure than the second hydraulic line 41 depending on the amount of cargo loaded, and in that case, the third state c is selected to block certain oil flows. In this way, the pressure oil does not flow wastefully from the first hydraulic line 37 side to the second hydraulic line 41 side. Thus, wasteful power consumption is reduced and the fuel consumption is improved.

The other parts of the configuration are the same as those of Embodiment 9 described above.

As described above, in the hybrid forklift of Embodiment 10: the first hydraulic line 37 through which pressure oil is supplied from the first hydraulic pump 26 to the cargo-handling hydraulic system, and the second hydraulic line 41 through which pressure oil is supplied from the second hydraulic pump 27 to the steering hydraulic system are connected to each other by the third hydraulic line 73; and the third hydraulic line 73 is provided with the directional control valve 77 switchable among the first state a of allowing the first hydraulic line 37 to communicate with the second hydraulic line 41, the second state b of allowing the first hydraulic line 37 to communicate with the third hydraulic line 75 communicating with the oil tank 76, and the third state c of blocking flows among the first hydraulic line 37, the second hydraulic line 41 and the third hydraulic line 75. Accordingly, if the first hydraulic line 37 requires a higher pressure than the second hydraulic line 41 depending on the amount of cargo loaded, the third state c of the directional control valve 77 is selected to block certain oil flows so that the pressure oil may not flow wastefully from the first hydraulic line 37 side to the second hydraulic line 41 side. In this way, wasteful power consumption is reduced and the fuel consumption is improved.

Moreover, in the hybrid forklift of Embodiment 10, the controller 95 can perform automatic switching (selecting) among the states a, b and c of the directional control valve 77 on the basis of the detection signals of the respective detecting means 91 to 94 and pressure gauges 96 and 97.

INDUSTRIAL APPLICABILITY

The present invention relates to a hybrid industrial vehicle including an engine and an electric motor as its drive source, and is useful when applied to a hybrid forklift or the like including an electric motor and an engine as its drive source for running.

The invention claimed is:

1. A hybrid industrial vehicle, comprising:
an engine;
a battery;
a first electric motor actuated when supplied with electric power from the battery;
a first gear train configured to transmit power of the first electric motor and power of the engine to a drive wheel through the first gear train;
a second electric motor actuated when supplied with electric power from the battery;
a first hydraulic pump supplying pressure oil to a cargo-handling hydraulic system;
a second gear train interposed among the engine, the second electric motor and the first hydraulic pump and mutually transmits power among the engine, the second electric motor and the first hydraulic pump;
a second hydraulic pump supplying pressure oil to a steering hydraulic system; and
a third electric motor actuated to drive the second hydraulic pump when supplied with electric power from the battery,
wherein the pressure oil discharged from the first hydraulic pump and the pressure oil discharged from the second hydraulic pump are merged on a hydraulic line shared by the first hydraulic pump and the second hydraulic pump, and then supplied to the cargo-handling hydraulic system and the steering hydraulic system.

2. The hybrid industrial vehicle according to claim 1, further comprising:
a hydraulic motor for cargo-handling regeneration actuated by pressure oil discharged from the cargo-handling hydraulic system; and
power transmitting means transmitting power only in a direction from the hydraulic motor side to the second hydraulic pump side, the hybrid industrial vehicle characterized in that
the hydraulic motor drives the third electric motor through the power transmitting means and the second hydraulic pump to thereby cause the third electric motor to function as a generator, and
electric power generated by the third electric motor functioning as a generator is charged into the battery.

3. The hybrid industrial vehicle according to claim 2, wherein the power transmitting means is a one-way clutch transmitting power only in the direction from the hydraulic motor side to the second hydraulic pump side.

4. A hybrid industrial vehicle, comprising:
an engine;
a battery;
a first electric motor actuated when supplied with electric power from the battery;
a first gear train configured to transmit power of the first electric motor and power of the engine to a drive wheel through the first gear train;
a second electric motor actuated when supplied with electric power from the battery;
a first hydraulic pump supplying pressure oil to a cargo-handling hydraulic system;
a second gear train interposed among the engine, the second electric motor and the first hydraulic pump and mutually transmits power among the engine, the second electric motor and the first hydraulic pump;
a second hydraulic pump supplying pressure oil to a steering hydraulic system; and
a third electric motor actuated to drive the second hydraulic pump when supplied with electric power from the battery,
wherein an accumulator is provided to a hydraulic line through which pressure oil is supplied from the second hydraulic pump to the steering hydraulic system.

5. The hybrid industrial vehicle according to claim 1, wherein an accumulator is provided to a hydraulic line through which pressure oil is supplied from the shared hydraulic line to the steering hydraulic system.

6. The hybrid industrial vehicle according to claim 2, wherein an accumulator is provided to a hydraulic line through which pressure oil from the shared hydraulic line is supplied to the steering hydraulic system.

7. A hybrid industrial, comprising:
an engine;
a battery;
a first electric motor actuated when supplied with electric power from the battery;
a first gear train configured to transmit power of the first electric motor and power of the engine to a drive wheel through the first gear train;
a second electric motor actuated when supplied with electric power from the battery;
a first hydraulic pump supplying pressure oil to a cargo-handling hydraulic system;
a second gear train interposed among the engine, the second electric motor and the first hydraulic pump and mutually transmits power among the engine, the second electric motor and the first hydraulic pump;
a second hydraulic pump supplying pressure oil to a steering hydraulic system; and
a third electric motor actuated to drive the second hydraulic pump when supplied with electric power from the battery, wherein a first hydraulic line through which pressure oil is supplied from the first hydraulic pump to the cargo-handling hydraulic system and a second hydraulic line through which pressure oil is supplied from the second hydraulic pump to the steering hydraulic system are connected to each other by a third hydraulic line, and the third hydraulic line is provided with a directional control valve switchable between a first state of allowing the first hydraulic line to communicate with the second hydraulic line, and a second state of allowing the first hydraulic line to communicate with a fourth hydraulic line communicating with an oil tank.

8. The hybrid industrial vehicle according to claim 7, wherein the directional control valve is switchable among the first state, the second state, and a third state of blocking flows among the first hydraulic line, the second hydraulic line and the fourth hydraulic line.

9. A hybrid industrial vehicle, comprising:

an engine;

a battery;

a first electric motor actuated when supplied with electric power from the battery;

a first gear train configured to transmit power of the first electric motor and power of the engine to a drive wheel through the first gear train;

a second electric motor actuated when supplied with electric power from the battery;

a first hydraulic pump supplying pressure oil to a cargo-handling hydraulic system;

a second gear train interposed among the engine, the second electric motor and the first hydraulic pump and mutually transmits power among the engine, the second electric motor and the first hydraulic pump;

a second hydraulic pump supplying pressure oil to a steering hydraulic system; and a third electric motor actuated to drive the second hydraulic pump when supplied with electric power from the battery, wherein a first hydraulic line and a second hydraulic line are connected to each other through a directional control valve, so that pressure oil, which is discharged from the first hydraulic pump to the first hydraulic line, and pressure oil, which is discharged from the second hydraulic pump to the second hydraulic line, are merged and then supplied to the cargo-handling hydraulic system and the steering hydraulic system, and the directional control valve is switchable between a first state of allowing the first hydraulic line to communicate with the second hydraulic line and a second state of allowing the first hydraulic line to communicate with a third hydraulic line communicating with an oil tank.

10. The hybrid industrial vehicle according to claim 9, wherein the directional control valve is switchable among the first state, the second state, and a third state of blocking flows among the first hydraulic line, the second hydraulic line and the third hydraulic line.

11. The hybrid industrial vehicle according to claim 7, wherein an accumulator is provided to the second hydraulic line.

12. The hybrid industrial vehicle according to claim 8, wherein an accumulator is provided to the second hydraulic line.

13. The hybrid industrial vehicle according to claim 9, wherein an accumulator is provided to the second hydraulic line.

14. The hybrid industrial vehicle according to claim 10, wherein an accumulator is provided to the second hydraulic line.

* * * * *